United States Patent [19]

McMurray

[11] 4,253,140
[45] Feb. 24, 1981

[54] METHOD AND APPARATUS FOR IMPROVED CONTROL OF AUXILIARY IMPULSE COMMUTATED INVERTERS

[75] Inventor: William McMurray, Schenectady, N.Y.

[73] Assignee: General Electric Company, Schenectady, N.Y.

[21] Appl. No.: 59,270

[22] Filed: Jul. 20, 1979

[51] Int. Cl.³ .......................................... H02P 13/18
[52] U.S. Cl. ..................... 363/96; 363/136; 363/138
[58] Field of Search .................. 363/27–28, 363/95, 96, 135–138

[56] References Cited

U.S. PATENT DOCUMENTS

| 3,207,974 | 9/1965 | McMurray | 363/136 |
| 3,805,141 | 4/1974 | Pompa, Jr. et al. | 363/135 |
| 3,846,694 | 11/1974 | Archer | 363/96 |
| 3,852,657 | 12/1974 | Skogsholm et al. | 363/96 |
| 3,919,620 | 11/1975 | McMurray et al. | 363/135 |

Primary Examiner—William M. Shoop
Assistant Examiner—Peter S. Wong
Attorney, Agent, or Firm—William H. Steinberg; James C. Davis, Jr.; Paul R. Webb, II

[57] ABSTRACT

Performance of an auxiliary impulse commutated inverter is significantly improved by controlling the interval between gating an inverter auxiliary thyristor into conduction for commutation of a then-conductive inverter main thyristor and subsequently gating an incoming inverter main thyristor into conduction as a function of inverter load current. When inverter commutation is commenced, a timing signal generator is actuated, producing a rising amplitude timing signal. A comparator continuously monitors the amplitude difference between the timing signal and a preselected inverter reference firing delay interval signal which varies in accordance with inverter load current. When the amplitude of the timing signal and inverter reference firing delay signal are equal, a bistable trigger resets the timing generator and causes the inverter incoming main thyristor to be gated into conduction, ending the commutation interval.

23 Claims, 31 Drawing Figures

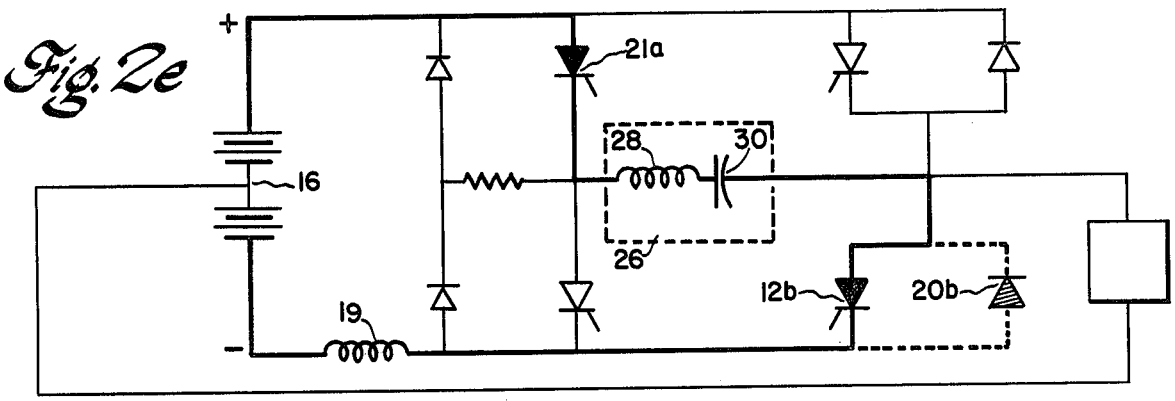
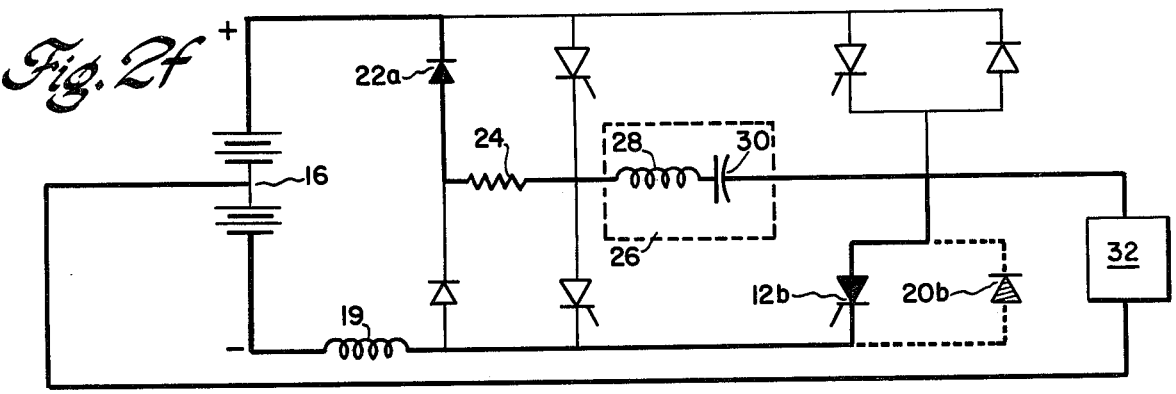
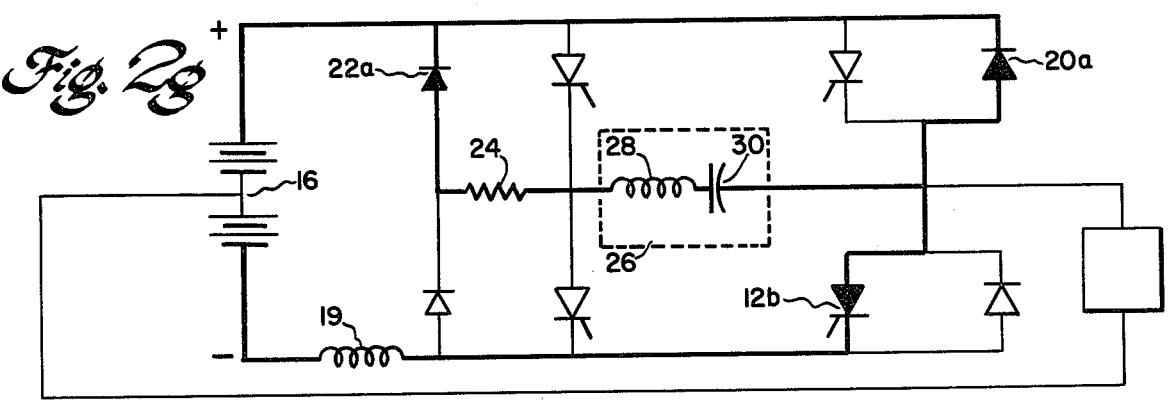
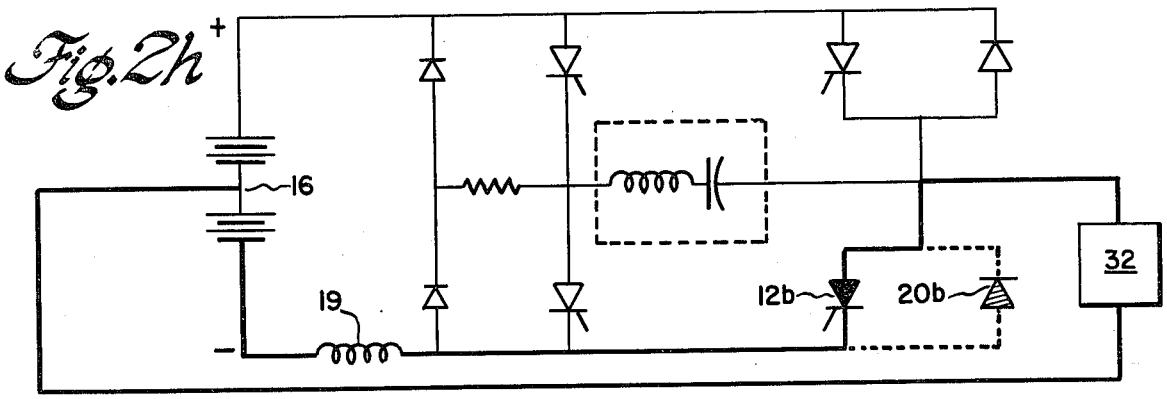

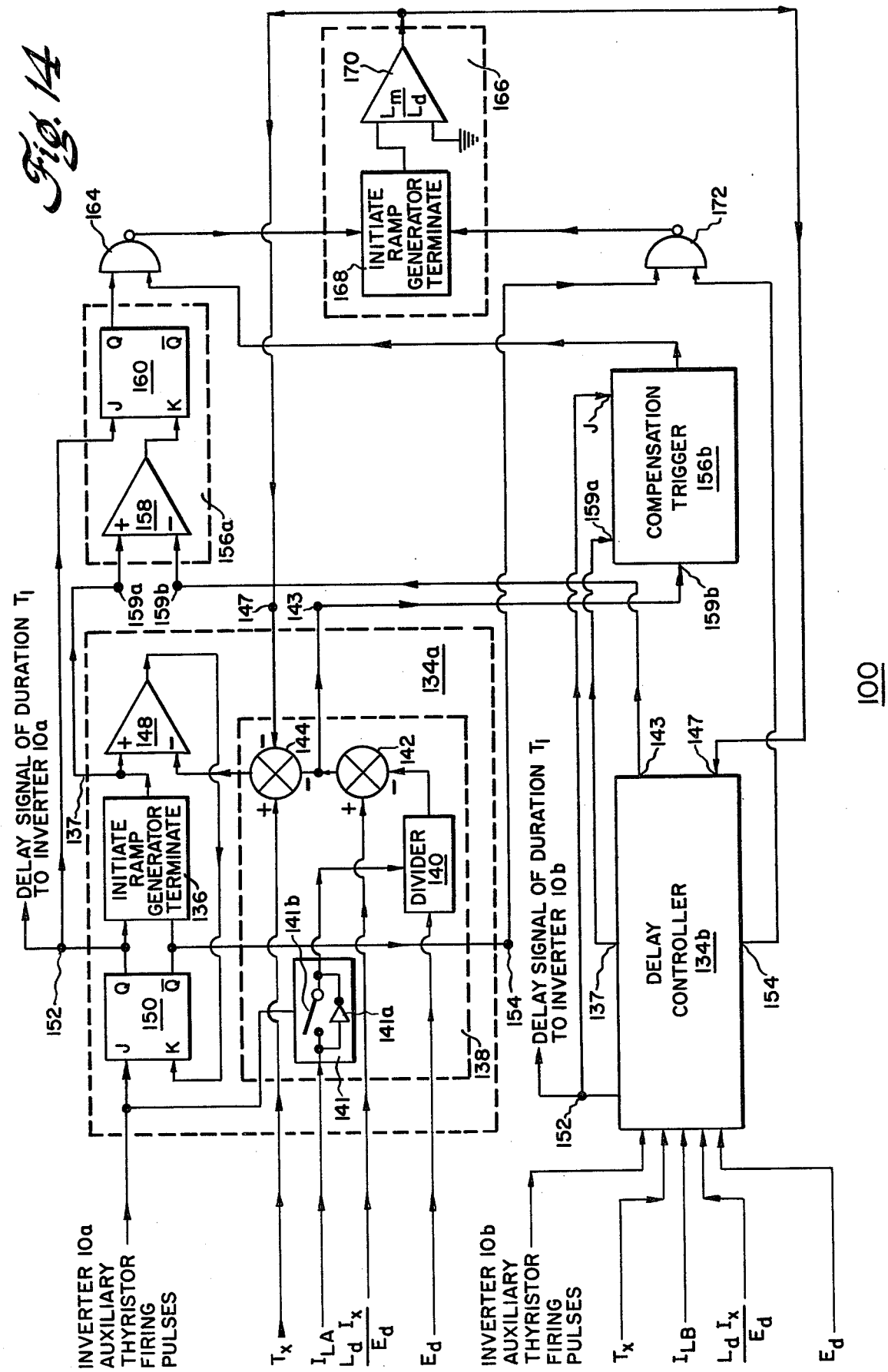

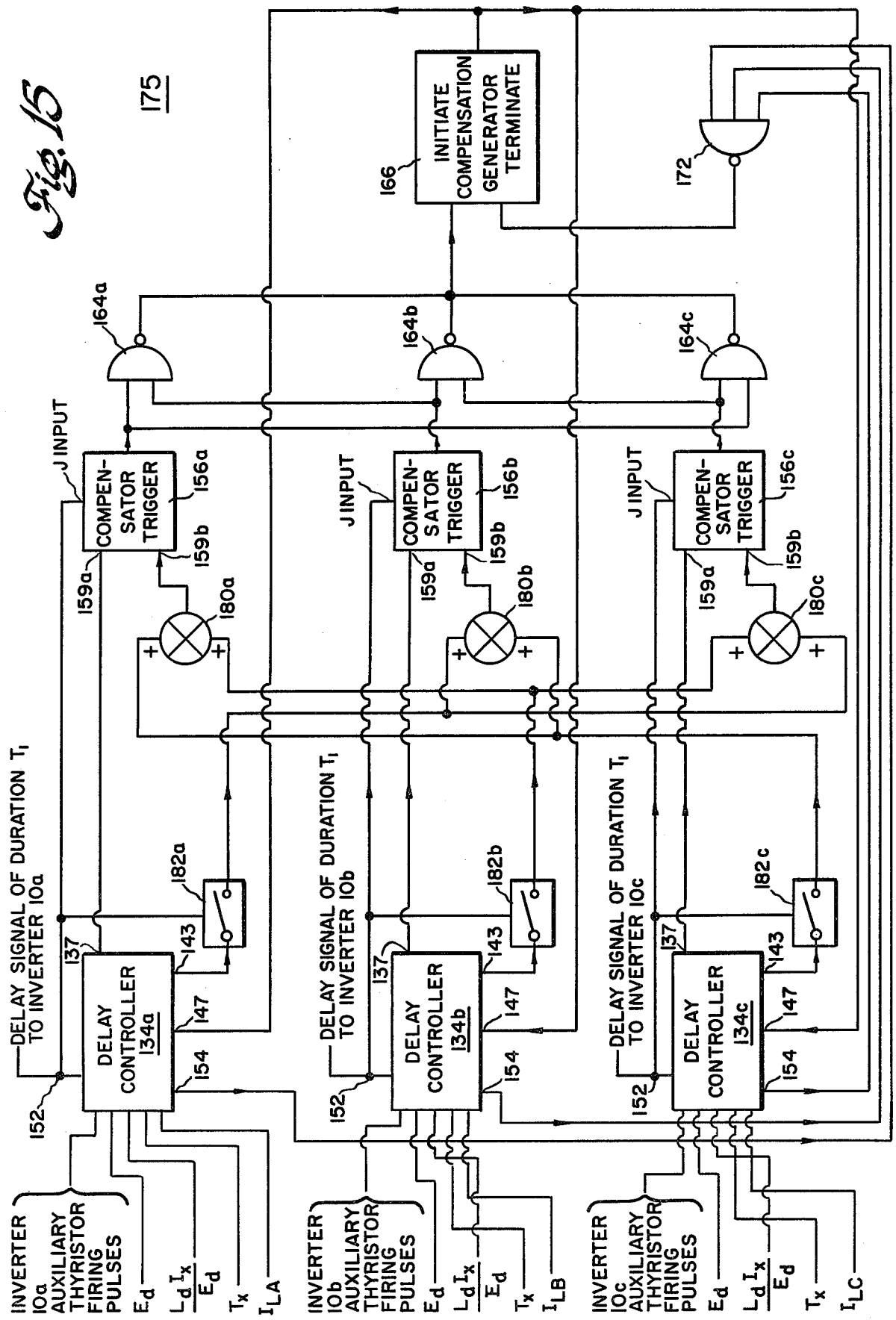

METHOD AND APPARATUS FOR IMPROVED CONTROL OF AUXILIARY IMPULSE COMMUTATED INVERTERS

BACKGROUND OF THE INVENTION

This invention relates to a method and associated apparatus for use with an auxiliary impulse commutated inverter circuit for controlling the firing delay interval between firing an inverter auxiliary thyristor to commutate a then-conductive inverter main thyristor and subsequently gating a then non-conductive inverter main thyristor into conduction as a function of inverter load current and source voltage.

In many industrial situations where only a fixed frequency voltage source is present, such as DC or low frequency AC, it is often necessary and even desirable to excite an AC load, such as a synchronous machine, with a voltage of different frequency than the source voltage. Voltage conversion is accomplished in such instances by utilizing an inverter coupled between the fixed frequency voltage source and the load. DC to AC or AC to AC voltage conversion is obtained during the "invert" mode of inverter operation while AC to DC conversion is obtained in the "rectify" inverter operation mode.

Inverter circuits commonly employed in voltage conversion applications typically include a pair of first and second main thyristors, coupled in series-aiding fashion across the fixed frequency source and which are connected at the thyristor junction to the load. Current is supplied to the load in a direction determined by the conduction of a corresponding main thyristor. Each main thyristor is commutated, that is to say, current conduction is extinguished, by reverse-biasing the thyristor. This is accomplished by gating or firing an appropriate one of a pair of auxiliary thyristors which couple a source of commutating voltage across the corresponding then-conductive main thyristor causing the same to be reverse biased and extinguished. Such an inverter circuit, appropriately denominated as an "auxilary impulse commutated inverter", is described and claimed in my U.S. Pat. No. 3,207,974 issued Sept. 21, 1965 and assigned to the assignee of the present invention. To the extent necessary for understanding of such inverter circuits, reference should be had to the above-identified patent.

During operation, the auxiliary impulse commutated inverter supplies current from a fixed frequency voltage source by alternately gating the first and second main thyristors into conduction. As will be appreciated by those skilled in the art, it is crucial to the operation of such inverter circuits that the corresponding auxiliary-thyristor be gated to commutate a then-conductive main thyristor at a preselected interval prior to rendering the remaining incoming or non-conductive main thyristor conductive. This is necessary to prevent the occurrence of a "shoot-through", when both the first and second main thyristors are simultaneously conductive, effectively placing a short circuit across the voltage source. To avoid the occurrence of a "shoot-through", the auxiliary thyristor is usually gated into conduction a fixed time interval prior to firing the remaining non-conductive main thyristor. This fixed time interval is typically selected by balancing such factors as power loss during inverter commutation intervals against the minimum time interval required to achieve main thyristor commutation.

With a fixed firing delay interval between firing an auxiliary thyristor and firing the remaining non-conductive main thyristor, increasing commutation losses inevitably result from increased inverter load current. However, by adjusting the inverter firing delay interval as a function of a dynamic circuit parameter such as inverter commutation current or source voltage, such commutation losses can be significantly reduced.

One such prior circuit for controlling the inverter thyristor firing delay interval as a function of a dynamic inverter circuit parameter is disclosed by E. A. Skogsholm et al. in U.S. Pat. No. 3,852,657, issued Dec. 3, 1974 and assigned to the assignee of the present invention. Skogsholm et al. sense inverter commutation (auxiliary inverter thyristor) current and render the incoming or remaining non-conductive thyristor conductive when the inverter commutation current amplitude decreases below a predetermined value.

Reduction of the inverter firing delay interval for a corresponding increase in inverter load current is accomplished in the apparatus of Skogsholm by increasing the commutation voltage applied across a then-conductive main inverter thyristor. The increased commutation voltage is obtained by "pumping up" or increasing the potential across a commutating capacitor. However, increasing the commutating capacitor voltage to reduce the inverter firing delay interval requires a large high-voltage commutating components, which components dissipate substantial power.

The method and associated apparatus, according to the present invention, control the inverter thyristor firing delay interval as a function of inverter load current and source voltage without dissipating substantial power.

It is an object of the present invention to provide a method and associated apparatus for varying the delay between firing an auxiliary thyristor and subsequently firing a nonconductive incoming main thyristor within an auxiliary impulse commutated inverter to reduce inverter commutation losses and prevent inverter interference.

It is another object of the present invention to provide a method and associated apparatus for varying the delay between firing an auxiliary thyristor and subsequently firing a nonconductive incoming main thyristor within an auxiliary impulse commutated inverter to limit inverter commutation time.

SUMMARY OF THE INVENTION

Briefly, in accordance with the preferred embodiment of the invention, apparatus for controlling the inverter firing delay interval within an auxiliary impulse commutated inverter between gating an auxiliary thyristor to commutate a then-conductive main thyristor and subsequently rendering an incoming main thyristor conductive comprises a timing duration signal generator for producing a timing signal continuously increasing in amplitude in response to an initiate signal, which timing signal is terminated in response to a terminate signal.

A reference inverter firing delay signal generator, responsive to inverter load current, provides a reference inverter firing delay signal corresponding to a preselected inverter thyristor firing delay interval between the start of conduction of an auxiliary thyristor and subsequent conduction of a previously nonconductive main thyristor.

The difference between the continuously increasing timing signal and the reference inverter firing delay signal is monitored by a comparator which provides at its output a logic signal in accordance with the difference in amplitude therebetween. The comparator output signal and inverter auxiliary thyristor gating signals are supplied to the first and second inputs, respectively, of a bistable trigger. In accordance with a preselected combination of bistable trigger input signals, the bistable trigger generates a delay signal, the presence of which inhibits the inverter incoming main thyristor from becoming conductive and generates control signals for initiating and terminating the continuously increasing timing signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 2a through 2h, respectively, are schematic representations of the inverter circuit of FIG. 1 illustrating device conduction during various inverter modes;

FIG. 5b is a block diagram of an alternate embodiment of the reference inverter firing delay signal generator for use in the delay controller shown in FIG. 5a;

FIG. 6a is a graphical representation of the the operation of the adjustable delay controller as shown in FIG. 5a;

FIG. 14 is a block diagram of an adjustable delay controller for reducing mutual interference between two single phase inverters of the polyphase inverter of FIG. 10; and FIG. 15 is a block diagram of an adjustable delay controller for reducing interference between three mutually interfering single phase inverters of the polyphase inverter of FIG. 10.

DETAILED DESCRIPTION OF THE PREFERRED EMBODIMENTS

To aid in the understanding of the structure and operation of the present invention, a brief review of the McMurray type auxiliary impulse commutated inverter circuit will be presented. For a more detailed understanding of the operation of inverter circuits, reference should be had to the aforementioned McMurray U.S. Pat. 3,207,974.

Figure 1:
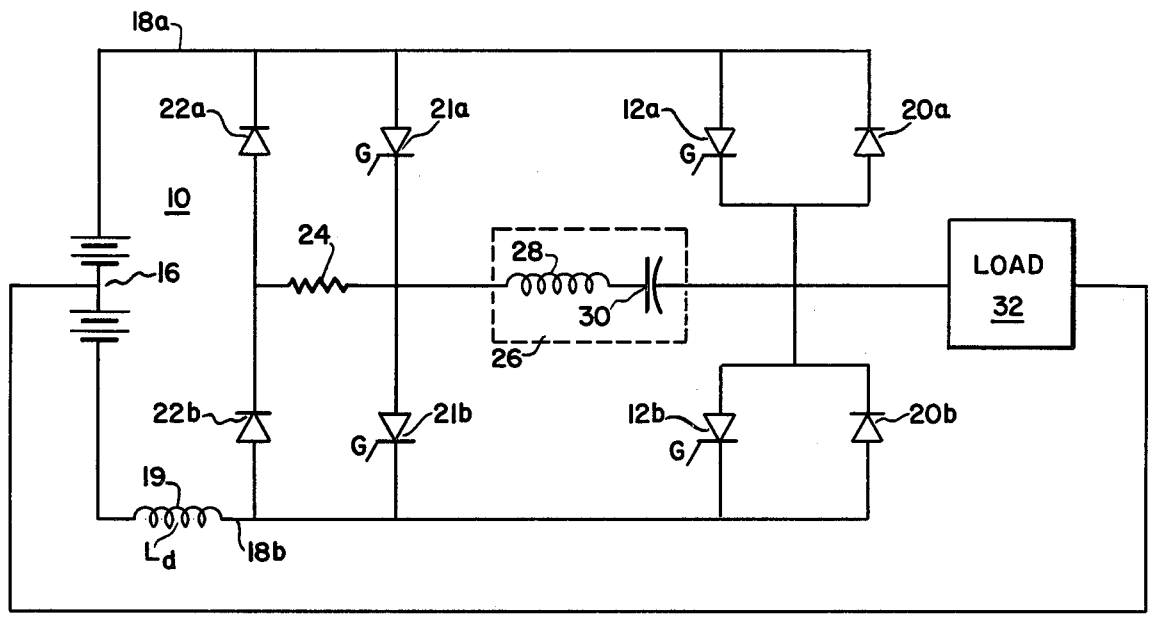
FIG. 1 is a schematic diagram of a McMurray-type inverter circuit for use with the present invention.

FIG. 1 shows inverter circuit 10 of the type described and claimed in the aforementioned McMurray patent. A pair of main controlled unidirectional conduction means such as thyristors 12a and 12b, respectively, each conducting current in response to a firing signal impressed at the respective thyristor gate electrode G, are coupled in series aiding fashion across a fixed frequency voltage source 16, shown as a DC source, by conductors 18a and 18b, respectively. For purposes of simplicity, the total combined inductance of conductors 18a and 18b is lumped into a single inductive element 19 having a value of inductance $L_d$. Coupled in parallel-opposition across each of thyristors 12a and 12b are unidirectional conduction means such as diodes 20a and 20b, respectively.

A second pair of controlled unidirectional conduction means, such as auxiliary thyristors 21a and 21b, are also coupled in series-aiding fashion across DC source 16 by conductors 18a and 18b, respectively. Each of auxiliary thyristors 21a and 21b, conducts current in response to a firing signal impressed at the respective thyristor gate electrode G. A second pair of unidirectional conduction means, such as diodes 22a and 22b, are coupled in series aiding fashion across DC source 16 by conductors 18a and 18b so as to be in parallel-opposition to the pair of thyristors 21a and 21b. A damping resistor 24 is coupled between the junctions of diodes 22a and 22b, respectively, and thyristors 21a and 21b, respectively. The function of damping resistor 24 will become apparent when reference is made to the operation of inverter 10, as set forth below. Commutating means 26 comprises an inductor 28 and capacitor 30 serially coupled between the respective junctions of auxiliary thyristors 21a and 21b, and main thyristors 12a and 12b, and stores sufficient commutation energy to commutate one of thyristors 12a or 12b as determined by the conductivity of thyristors 21a or 21b, respectively.

A load 32, such as a respective phase of a polyphase synchronous machine, is coupled between the junction of main thyristors 12a and 12b and a mid voltage tap in DC source 16.

The operation of inverter circuit 10 may best be understood with reference to FIGS. 2a through 2h. Because various circuit devices may be conductive during separate time intervals, those circuit devices which are conductive during a specific time interval are illustrated by broadened lines and filled-in areas while the nonconductive devices are shown by finer lines and unfilled-in areas. The appropriate sequence of time intervals of device conduction will hereinafter be designated topology modes 1 through 7 and 1'.

Figure 2A:
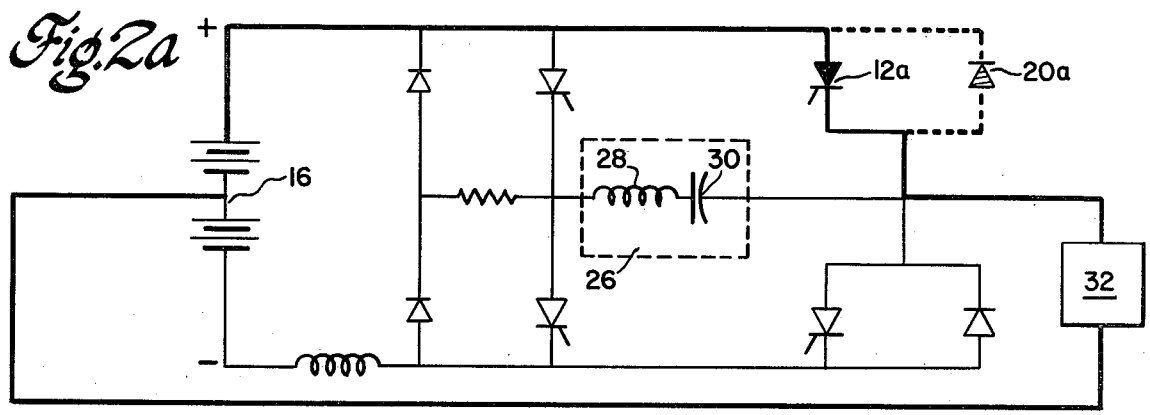

Topology mode 1, as illustrated in FIG. 2a, prevails during the interval between each successive pair of inverter commutations and generally occupies the major part of the half cycle during which time thyristor 12a is conductive. Initially, a voltage is impressed across commutation means 26 storing energy therein which causes the plate of capacitor 30 connected to thyristor 12a to be positive with respect to the other plate. During the interval main thyristor 12a is conductive, a current $I_L$ is present through load 32. When current is conducted through load 32 in a direction opposite to current through main thyristor 12a, main diode 20a is forward biased, permitting current conduction through DC source 16.

Figure 2B:
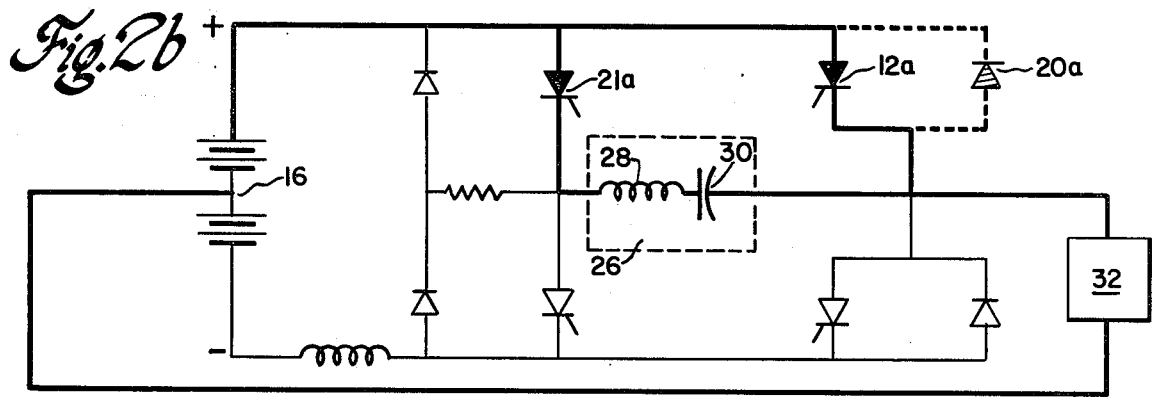

To commence commutation of thyristor 12a, auxiliary thyristor 21a is gated "on" by an external firing signal impressed at its gate electrode G. The interval during which auxiliary thyristor 21a is conductive is represented by topology mode 2 as shown in FIG. 2b. With auxiliary thyristor 21a conductive, a half sine wave pulse of current $i_c$, corresponding to stored charge in capacitor 30, first extinguishes the conduction of main thyristor 12a (if conductive) and then continues through main diode 20a.

Figure 2C:
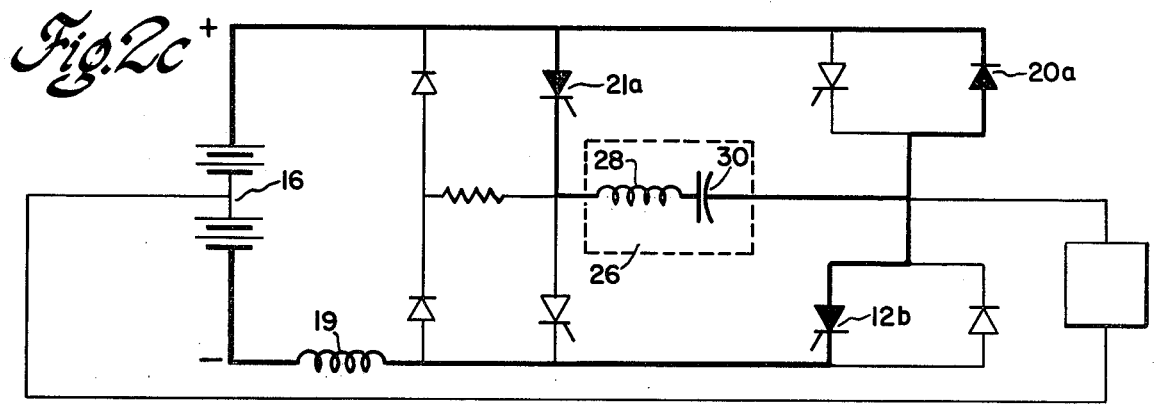
Figure 2D:
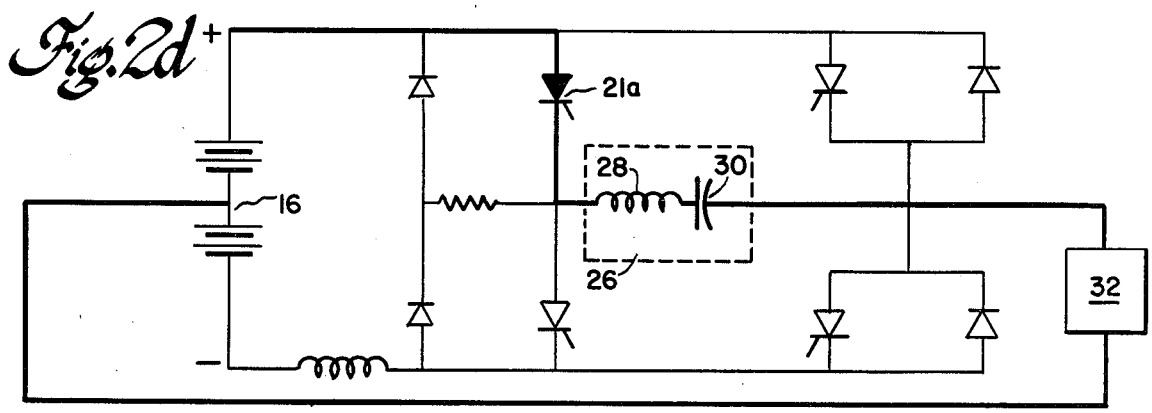

If main thyristor 12b is gated "on" while main diode 20a is still conductive, then lumped inductance 19 effectively spans DC supply 16 as shown by topology mode 3 in FIG. 2c. If, however, current conduction through main diode 20a is extinguished prior to gating main thyristor 12b into conduction, then the load current $I_L$ is conducted through auxiliary thyristor 21a, inductor 28 and capacitor 30 as shown in FIG. 2d. Thus, topology mode 4, as represented by FIG. 2d, has only one current polarity and therefore occurs only as part of a necessary commutation process. A necessary commutation may be defined as a commutation sequence during which conduction of main thyristors 12a or 12b must necessarily be extinguished by stored commutation energy supplied by commutation means 26, whereas a redundant commutation is defined as a commutation sequence during which load current through a respective one of main diodes 20a or 20b commutates one of main thyristors 12a or 12b, accordingly.

Topology mode 5, as represented in FIG. 2e, may occur after current conduction through main diode 20a is extinguished, or may occur after topology mode 4, when either the incoming main thyristor 12b is gated "on" or when diode 20b is conductive, representing positive load current conduction. Topology mode 5 can also follow topology mode 2 directly during a necessary commutation sequence. During topology mode 5, capacitor 30 is effectively coupled across DC source 16 in series with inductor 28 and charges above the voltage amplitude $E_d$ of DC source 16 because of stored energy within inductor 28 adding to the energy supplied from DC source 16.

Topology mode 6, as represented in FIG. 2f, occurs after topology mode 5 and represents the final topology mode during the commutation sequence. Capacitor 30 overcharge, which occurs during topology mode 5, is returned to DC source 16 through damping resistor 24, inductor 28 and forward biased diode 22a.

Topology mode 7, as represented in FIG. 2g, occurs when excess capacitor charge is returned through diode 22a to DC source 16 while both main thyristor 12b and main diode 20a are conductive. Mode 7 represents an intermediate stage of redundant commutation, and follows topology mode 3 while preceding either topology modes 5 or 6.

Topology mode 1', as illustrated in FIG. 2h, follows topology mode 6 and prevails during the subsequent half cycle. Topology mode 1' is therefore analogous to topology mode 1 except that main thyristor 12b is conductive instead of main thyristor 12a. Correspondingly, although not shown, modes 2' through 7' may be defined for the commutation sequence of main thyristor 12b, thereafter reverting once again to topology mode 1.

As noted earlier, the commutation sequence of corresponding topology modes may be defined as either necessary (requiring a respective main thyristor to necessarily be extinguished) or redundant (the then conductive main thyristor having been previously commutated by load current through a corresponding main diode). Although seven possible commutation sequences may exist (four possible necessary sequeneces and three possible redundant sequences) only the type N1 (necessary) commutation sequence and the type R1 (redundant) commutation sequence will be discussed as one or the other prevails over most of the range of load current.

Figure 3A:
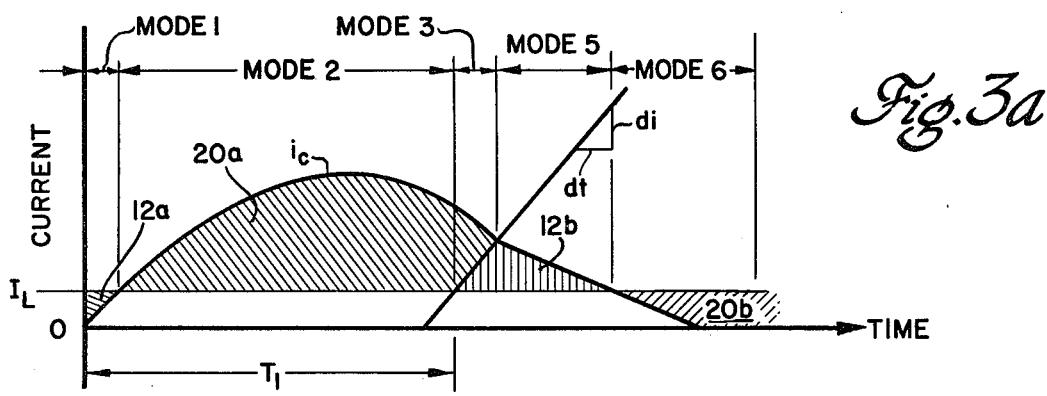
FIG. 3a is a graphical representation of inverter commutation current with respect to time for a N1-type inverter commutation mode sequence.

Necessary commutation sequence type N1 corresponds to a mode sequence of topology modes 1, 2, 3, 5 and 6. By reference to the corresponding FIGS. 2a, 2b, 2c, 2e, and 2f, respectively, it may be observed that necessary commutation sequence type N1 occurs when one of the main thyristors, such as 12a or 12b, is gated "on" before the commutating current pulse supplied by capacitor 30 decreases below the level of load current. The commutation current waveform with respect to time for the N1 type commutation sequence is illustrated in FIG. 3a. The instantaneous current in auxiliary thyristor 21a and commutation means 26 equals the difference between parallel points on the commutation current $i_c$ and inverter load current $I_L$ waveforms. The intervals during which a respective one of main thyristors 12a and 12b and a respective one of main diodes 20a and 20b are conductive are denoted by the shaded areas containing the reference number of the respective conductive devices.

Figure 3B:
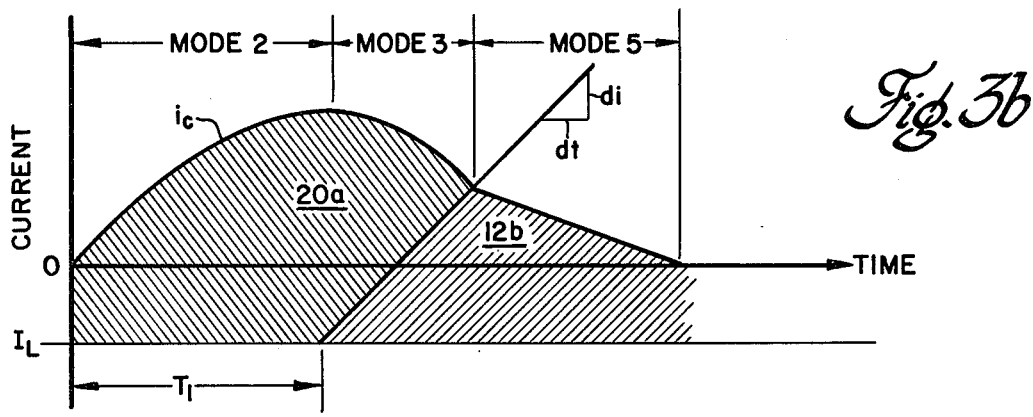
FIG. 3b is a graphical representation of inverter commutation current with respect to time for an R1-type inverter commutation mode sequence.

Redundant commutation sequence type R1 results also from a topology mode sequence of topology modes 1, 2, 3, 5 and 6. Commutation sequence type R1 is topologically identical to necessary commutation sequence type N1 as described above, differing only by the polarity of load current. Commutation sequence R1 occurs when an incoming main thyristor, such as 12b, is gated early enough to conduct the entire load current before the redundant commutating pulse has ended. The commutation current waveform with respect to time, representing commutation sequence R1, is illustrated in FIG. 3b. The instantaneous current is auxiliary thyristor 21a and commutation means 26 equals the difference between parallel points on the commutation current and load current waveforms. As with FIG. 3a, the intervals during which main thyristor 12b and main diode 20a are conductive are denoted by the shaded areas containing the reference number of the respective conductive device.

To avoid the occurence of a "shoot through", the time interval between gating one of auxiliary thyristors 21a and 21b, and subsequently gating the remaining nonconductive one of main tyristors 12b and 12a into conduction, is fixed to provide sufficient time for main thyristor commutation. For a fixed time delay interval $T_1$ between gating an auxiliary thyristor into conduction and subsequently gating a nonconductive or incoming main thyristor into conduction, the duration of each of topology modes 2, 3, 5 and 7, respectively, varies as a function of the load current $I_L$. This, in turn, results in increased commutation losses during a necessary commutation sequence and extended commutation time intervals during redundant commutation sequences as load current increases in absolute magnitude.

Since commutation sequence types R1 and N1 are topologically identical, no discontinuity exists between topology mode boundaries for a reversal in load current polarity. By examining FIGS. 2c, 3a and 3b, it is evident that, during topology mode 3, the rate of change of current conduction di/dt through a previously nonconductive main thyristor, such as 12b, is determined by the magnitude $E_d$ of source 16 voltage and the value $L_d$ of lumped inductance 19 which snaps source 16 during this interval. Consequently, di/dt can be expressed as $$di/dt = E_d/L_d \quad (1)$$

The duration of the toplogy mode 3 interval depends on the amplitude of current that must be switched into the incoming main thyristor. As the magnitude of the load current $I_L$ increases negatively, the duration of the mode 3 interval increases. Thus, if the incoming main thyristor, such as thyristor 12b, is gated into conduction at a fixed time interval after commencement of commutation of the then-conductive main thyristor 12a, then the subsequent boundary conditions (specifically the voltage across capacitor 30) will vary as load current varies. Since the commutation current pulse is dependent on stored capacitor charge, the total duration of the commutation interval will also vary. Although undesirable, this is inevitable for a fixed inverter firing time delay. If, however, the subsequent mode 5 interval always begins with substantially the same boundary conditions with respect to dynamically changing components of capacitor 30 charge and inductor 28 current, then the duration of the mode 5 interval will be constant and independent of load current. Such a result may be achieved by adjusting the firing time delay interval between gating an auxiliary thyristor into conduction and subsequently gating an incoming main thyristor into conduction so that the mode 3-5 interface occurs at a fixed time interval $T_X$ after commencement of commutation. This can be effected because the commutation current pulse, produced during mode 2, continues unaffected during topology mode 3 until current conduction through a previously-conductive main diode, such as 20a, is extinguished, thereby beginning topology mode 5.

The desired inverter behavior, as described above is graphically illustrated in FIG. 4a. Under conditions where the current $I_L$ through load 32 is of a magnitude less than $I_X$, the inverter commutation current at time $T_X$ at which the mode 3-5 interface occurs, the desired inverter firing delay time $T_1$ is related to the inverter load current $I_L$ and DC source voltage $E_d$ as follows. If a time $T_o$ is defined to represent the fixed time interval between gating an auxiliary thyristor, such as thyristor 21a, into conduction at the commencement of commutation and subsequently gating a main thyristor, such as 12b, into conduction under conditions where the load current $I_L$ is zero, then the delay time $T_1$, under conditions where the load current $I_L$ is not zero, can be expressed as:

$$T_1 = T_o + L_d I_L / E_d \quad (2)$$

Alternatively, $T_1$ can be expressed as $$T_1 = T_X - L_d(I_X - I_L)/E_d \quad (3)$$

Neglecting losses in inductor 28 and capacitor 30, the current $I_X$ can be expressed as $$I_X = I_m \sin \omega_0 T_X \quad (4)$$

where $I_m$ is the peak commutation current magnitude and $\omega_O = 1/\sqrt{LC}$ where L represents the inductance of inductor 28 and C represents the capacitance of capacitor 30.

In practice, the previous capacitor overcharge will have decayed such that the initial voltage across capacitor 30 equals the magnitude of source 16 voltage, $E_d$. Thus, $I_m$ can be expressed $$I_m = E_d/X_o \quad (5)$$

where $X_o = \sqrt{L/C}$.

Figure 4A:
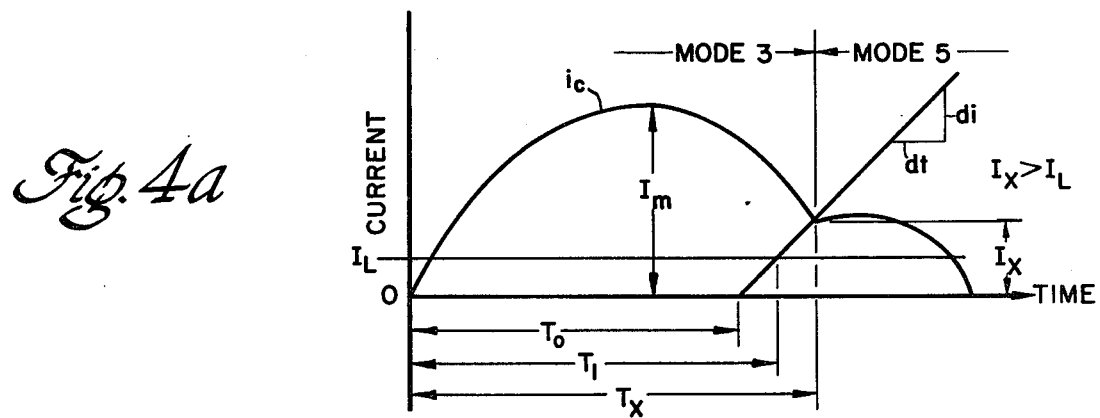
FIGS. 4a and 4b, respectively, are graphic representations of inverter commutation current with respect to time for separate values of inverter load current.

Substituting equation (5) into equation (4) yields the expression $$I_X = E_d/X_o \sin \omega_o T_X \quad (6)$$

which illustrates that $I_X$ is proportional to the source voltage $E_d$. Note that for the condition when the magnitude of inverter load current $I_L$ is less than the magnitude $I_X$, as is shown in FIG. 4a, the current through capacitor 30 will always have the same waveform. At time $T_X$, the voltage across capacitor 30 and the current through inductor 28 and capacitor 30 are fixed for a fixed source voltage $E_d$. The final capacitor voltage and the total commutation time are also constrained to be fixed as discussed above.

Figure 4B:
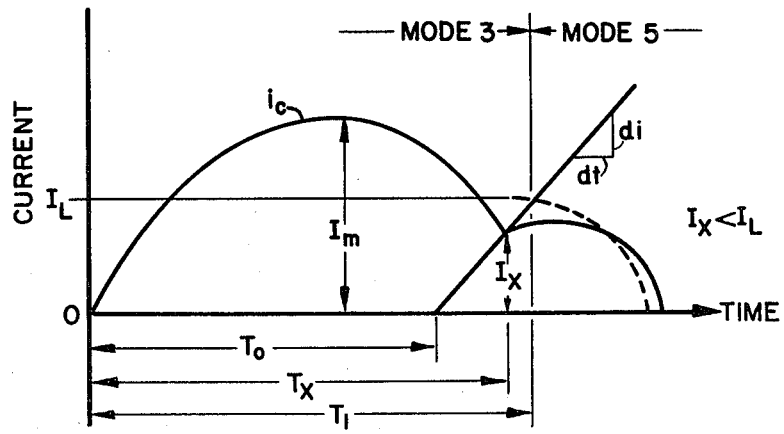

Under conditions when the magnitude of inverter load current $I_L$ exceeds the magnitude of inverter commutation current $I_X$ at time $T_X$, as is shown in FIG. 4b, then, as is evident from equation 4, the then non-conductive inverter main thyristor must be fired after the time $T_X$, causing inverter 10 to revert to a topology mode sequence of topology modes 1, 2, 4, 5 and 6. This causes a reduction of total commutation time and an increase in peak capacitor voltage.

Figure 5A:
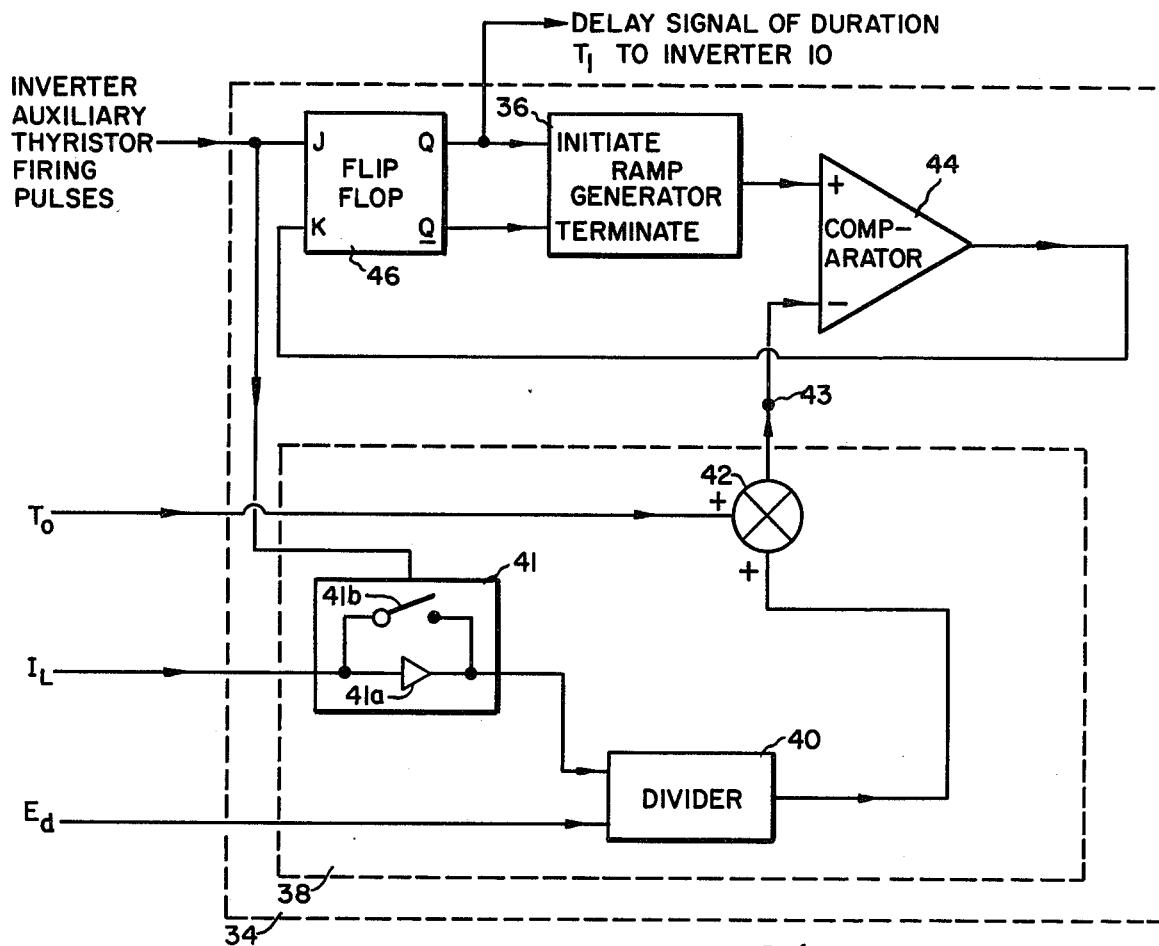
FIG. 5a is a block diagram of the adjustable delay controller of the present invention including a first reference inverter firing delay signal generator embodiment.

FIG. 5a shows an adjustable firing time delay controller 34 for adjusting the inverter firing time delay interval as described above. Adjustable delay controller 34 includes timing duration signal generating means, shown as ramp generator 36, which produces a continuously increasing (ramp) signal in response to an initiate signal impressed at the ramp generator initiate input. A terminate signal supplied to the terminate input of ramp generator 36 terminates the ramp signal and resets ramp generator 36 until a subsequent initiate signal is supplied to the initiate input.

A reference inverter firing delay signal generating means 38 is provided to generate a signal proportional in amplitude to the desired delay interval of duration $T_1$ as defined above. Reference inverter firing delay signal generating means 38 comprises an analog divider 40, which, in accordance with a signal proportional to inverter load current $I_L$, which is derived from a current transformer (not shown) coupled in series with inverter 10 and load 32, and with a voltage proportional to inverter source voltage $E_d$, generates an output signal proportional to the magnitude ratio $I_L/E_d$. To maintain the polarity of the divider output signal positive during both necessary and redundant inverter commutations, a polarity processor 41 is coupled between the current transformer and divider 40 for processing the polarity of the inverter load current signal. Polarity processor 41 comprises a polarity inverter 41a which is shunted by an electronic switch 41b, actuated in accordance with the polarity of inverter load voltage as determined from inverter auxiliary thyristor firing pulses. During commutations of inverter 10 in which the polarity of inverter load voltage is negative, the analog switch 41b is open which causes the polarity of the inverter load current signal supplied to divider 40 to be inverted. During commutations in which the polarity of inverter load voltage is positive, the analog switch 41b is closed and polarity inverter 41a is bypassed, thereby causing the inverter load current signal supplied to divider 40 to remain unaffected.

If the voltage magnitude $E_d$ of source 16 remains relatively constant, then divider 40 can be replaced by a linear scaling network adjusted to scale the inverter load current signal proportional to $I_L/E_d$.

The output signal of divider 40 is summed at a summing amplifier 42 with a fixed value reference signal from an external source (not shown) proportional in amplitude to the time duration $T_o$, as defined earlier, to yield a reference inverter firing delay signal corresponding to the expression $T_o + L_d I_L/E_d$, which signal appears at node 43.

A comparator 44 is coupled to receive the ramp signal from ramp signal generator 36 at the first comparator input and the reference inverter firing delay signal from reference inverter firing delay signal generator 38 at the second comparator input. Accordingly, comparator 44 provides a logical signal, representing the difference in magnitude between the first and second comparator input signals, which logic signal is thence impressed on the K input of a bistable triggering means, shown as a JK flip-flop 46. The J input of JK flip flop 46 is supplied from inverter 10 with auxiliary thyristor gating pulses. The Q output of flip flop 46 is coupled to inverter 10 and to the initiate input of ramp generator 36. The $\overline{Q}$ output of flip flop 46 is coupled to the terminate input of ramp generator 36. As will be better understood by reference to operation of adjustable delay controller 34 set forth below, when the J and K input signals supplied to flip flop 46 are of a first prescribed relationship, the Q input signal goes "high", that is, the voltage at the Q output goes to a logical "1" level causing ramp generator 36 to be charged and a delay signal to be supplied to inverter 10 to delay the conduction of a previously nonconductive main thyristor. When the J and K input signals supplied to flip-flop 46 are of a second prescribed relationship, the $\overline{Q}$ output signal of the flip-flop 46 goes "high" and the Q output signal consequently goes "low", that is, the voltage at the Q output deviates to a logical "0" level. Once the Q output signal of flip-flop 46 goes "low", the delay signal supplied to inverter 10 is interrupted causing the previously nonconductive inverter main thyristor to be gated into conduction, and ramp generator 36 to be discharged and the output signal therefrom to be extinguished.

Figure 5B:
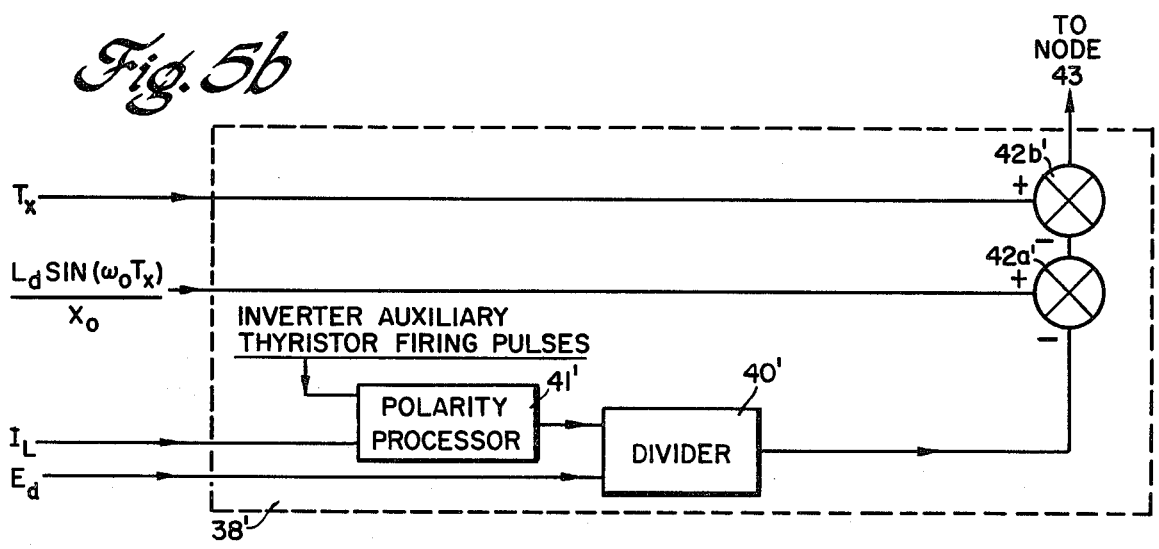

An alternate embodiment 38' of reference inverter firing delay signal generating means 38 of FIG. 5a is shown in block form in FIG. 5b. As will become clear by reference to the operation of alternate reference inverter firing delay signal generator 38' set forth below, signal generator 38' also generates a reference inverter firing delay signal proportional in amplitude to the delay interval of duration $T_1$. Reference inverter firing delay signal generator 38' comprises a divider 40' which, in accordance with a signal proportional in amplitude to inverter load current $I_L$ and a voltage proportional to the inverter source voltage $E_d$, generates a signal proportional to the ratio magnitude $I_L/E_d$. To insure that the output signal of divider 40' is maintained at proper polarity during necessary and redundant inverter commutations, a polarity processor 41' is provided to alter the polarity of the inverter load current signal supplied to divider 40'. Polarity processor 41' is configured identical to polarity processor 41 of FIG. 5a and thus, in response to inverter 10 auxiliary thyristor gating pulses, it adjusts the polarity of the inverter load current signal supplied to divider 40'.

The output signal generated by divider 40' is supplied to the first input of summing amplifier 42a'. The second summing amplifier input is supplied with a first fixed-value reference signal from an external source (not shown) which is proportional to the magnitude of the expression $L_d/X_o \sin(\omega_o T_X)$ which by examination of equation (6), is proportional to $I_X/E_d$. Summing amplifier 42a' supplies an output signal, according to the difference in magnitude between signals received at the first and second inputs, to the first input of a second summing amplifier 42b'. The second input of summing amplifier 42b' is supplied with a second reference signal from a second external source (not shown) which is proportional in amplitude to the interval of duration $T_X$. Summing amplifier 42b' provides an output signal, varying in accordance with the difference in magnitude between the first and second input signals, and which is proportional to the expression $T_X - L_d(I_X - I_L)/E_d$. This output signal appears at node 43 shown in FIG. 5a.

Figure 6A:
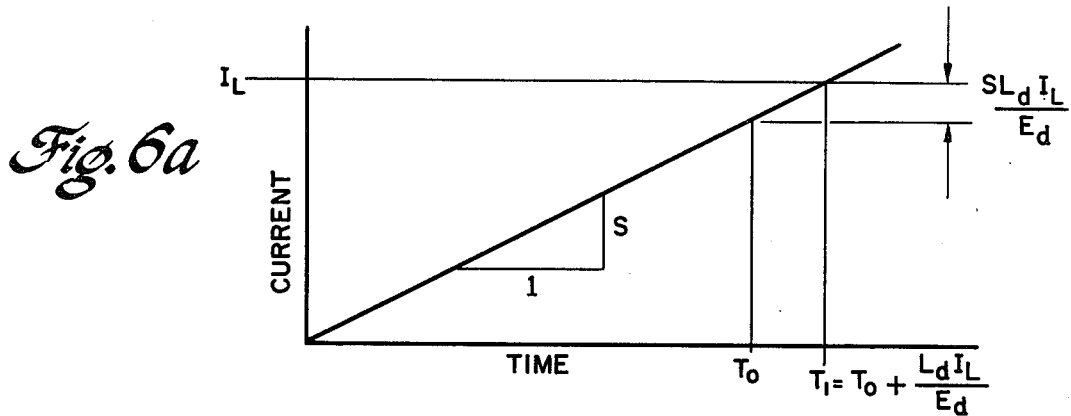
Figure 6B:
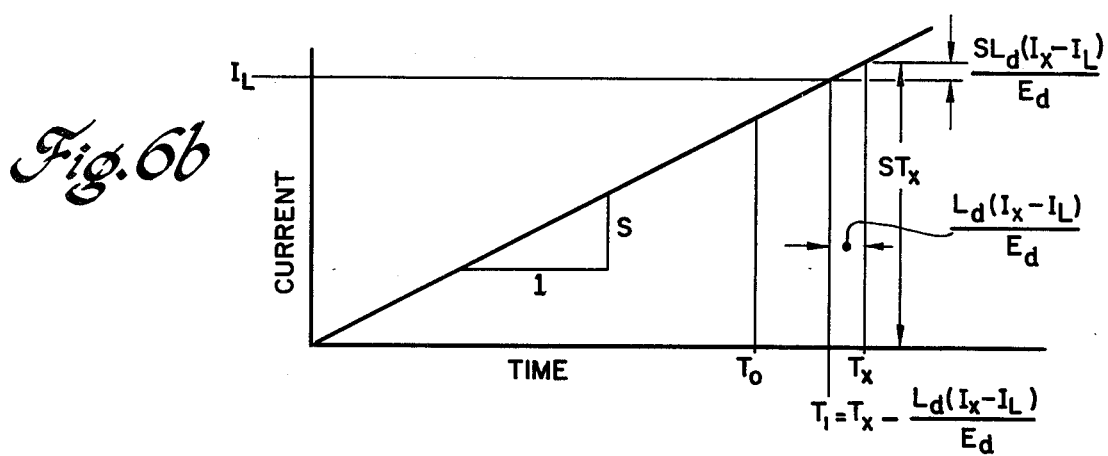
FIG. 6b is a graphical representation of the operation of the adjustable delay controller of FIG. 5a employing the alternate reference inverter firing delay signal generator embodiment of FIG. 5b.

Operation of the adjustable firing time delay controller of FIG. 5a, and the adjustable firing time delay controller of FIG. 5a employing alternate reference inverter firing delay signal generator means 38' of FIG. 5b, may best be understood with reference to FIGS. 6a and 6b, respectively. Initially, it is assumed that ramp generator 36 is discharged and each inverter auxiliary thyristor is nonconductive, causing a logical "0" level voltage to appear at both the J and K inputs of flip-flop 46. When an inverter auxiliary thyristor is gated into conduction to commutate a then-conductive main inverter thyristor, the signal at the J input of flip-flop 46 goes to "high", causing flip-flop 46 to transition and drive the Q output signal "high". When the Q output signal goes "high", a delay signal is supplied to inverter 10 to delay conduction of the remaining nonconductive inverter main thyristor. Also, when the Q output signal goes "high", an initiate signal is supplied to ramp generator 36, causing the ramp generator to generate a ramp signal of constant slope S. The ramp signal amplitude increases until it equals the amplitude of the reference signal produced by either of reference inverter firing delay signal generators 38 and 38'. When this occurs, (as represented by the intersection of the ramp signal waveform with the load current magnitude $I_L$, as shown in FIG. 6a for delay controller 34 including reference inverter firing delay signal generator 38 of FIG. 5a, and as shown in FIG. 6b for delay controller 34 containing alternate reference inverter firing delay signal generator 38' of FIG. 5b), the output signal of comparator 44 goes "high", causing a logical "one" level voltage to appear at both the J and K inputs of flip-flop 46. Flip-flop 46 again transitions, terminating the ramp signal by discharging ramp generator 36 and interrupting the delay signal supplied to inverter 10, thus causing the remaining nonconductive main thyristor to be gated into conduction.

Figure 7A:
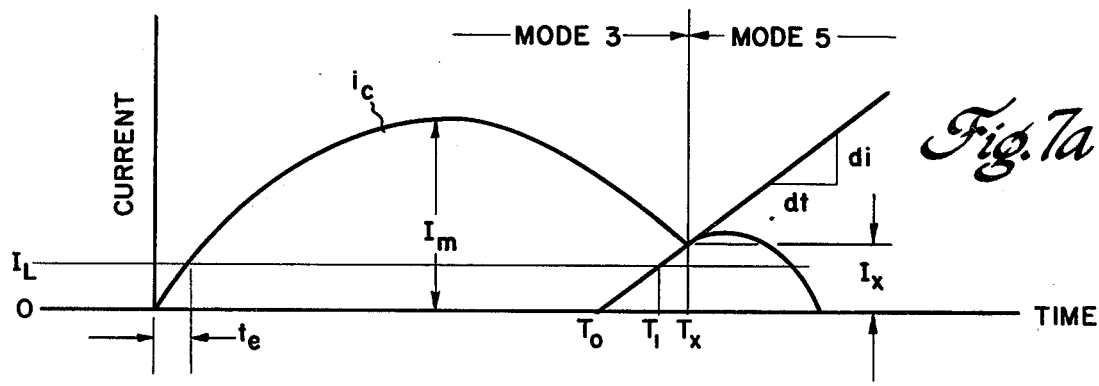
FIG. 7a is a graphical representation of inverter commutation current with respect to time for a necessary commutation sequence.

To avoid the necessity of using expensive analog dividers 40 and 40' in reference inverter firing delay signal generators 38 and 38', respectively, an alternate method may be employed to vary the inverter firing time delay intervals as a function of load current so that the mode 3-mode 5 interface occurs at a fixed time $T_X$ after commencement of inverter commutation. FIG. 7a shows the commutation current waveform $i_c$ of inverter 10 of FIG. 1 with respect to time for the condition $I_L > 0$ (corresponding to a necessary commutation sequence). During a necessary commutation sequence, current through a then-conductive inverter main thyristor, such as thyristor 12a of inverter 10 shown in FIG. 1, for example, is extinguished after a time interval $t_e$. If losses in capacitor 30 and inductor 28 are neglected, then the commutation current $i_c$ will be given by $$i_c = I_m \sin \omega_o t \quad (7)$$

where $I_m$ represents the maximum commutation current amplitude.

Figure 7B:
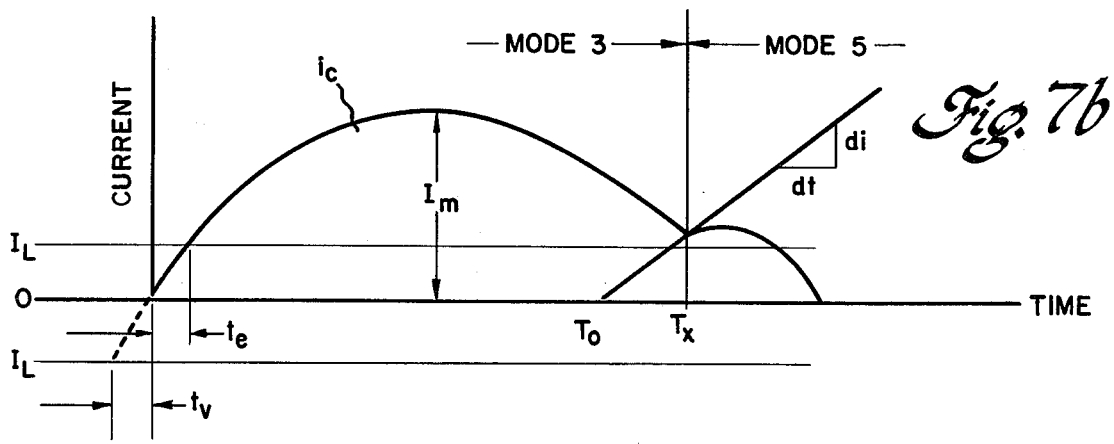
FIG. 7b is a graphical representation of inverter commutation current with respect to time for a redundant commutation sequence.

However, for a redundant commutation, (inverter load current being negative), the commutation current waveform will not intersect the load current waveform, as shown in FIG. 7b. By extending the commutation current waveform (as shown by the dashed line segment in FIG. 7b) a "virtual" extinction time $t_v$, having a negative value, can be mathematically defined by the intersection of the extension of the commutation current waveform with the inverter load current waveform.

If a value $t'_e$ is defined to have a magnitude $|t'_e|$ and polarity proportional to either of $t_e$ or $t_v$, (corresponding to a necessary and redundant commutation, respectively), then the inverter firing time delay of duration $T_1$ between gating an auxiliary thyristor into conduction to commutate a then-conductive main thyristor and subsequently gating a remaining non-conductive main thyristor into conduction can be calculated as follows. By examining FIGS. 7a and 7b and equation (7), it may be seen that $$\omega_o t'_e = \sin^{-1}(I_L/I_m) \quad (8)$$

which for small angles can be expressed as $$\omega_o t'_e \approx I_L/I_m \quad (9)$$

Substituting the value for $I_m$ previously derived in equation (5) yields the expression $$I_L/I_m = I_L X_o/E_d \quad (10)$$

Therefore, $$I_L/E_d \approx \omega_o t'_e/X_o = t'_e/L. \quad (11)$$

Substitution of equation (11) into equation (2) yields the time delay function $$T_1 = T_o + t'_e L_d/L \quad (12)$$

or $$T_1 = T_o + L_d/X_o \sin^{-1}(I_L/I_m) \quad (13)$$

Figure 8:
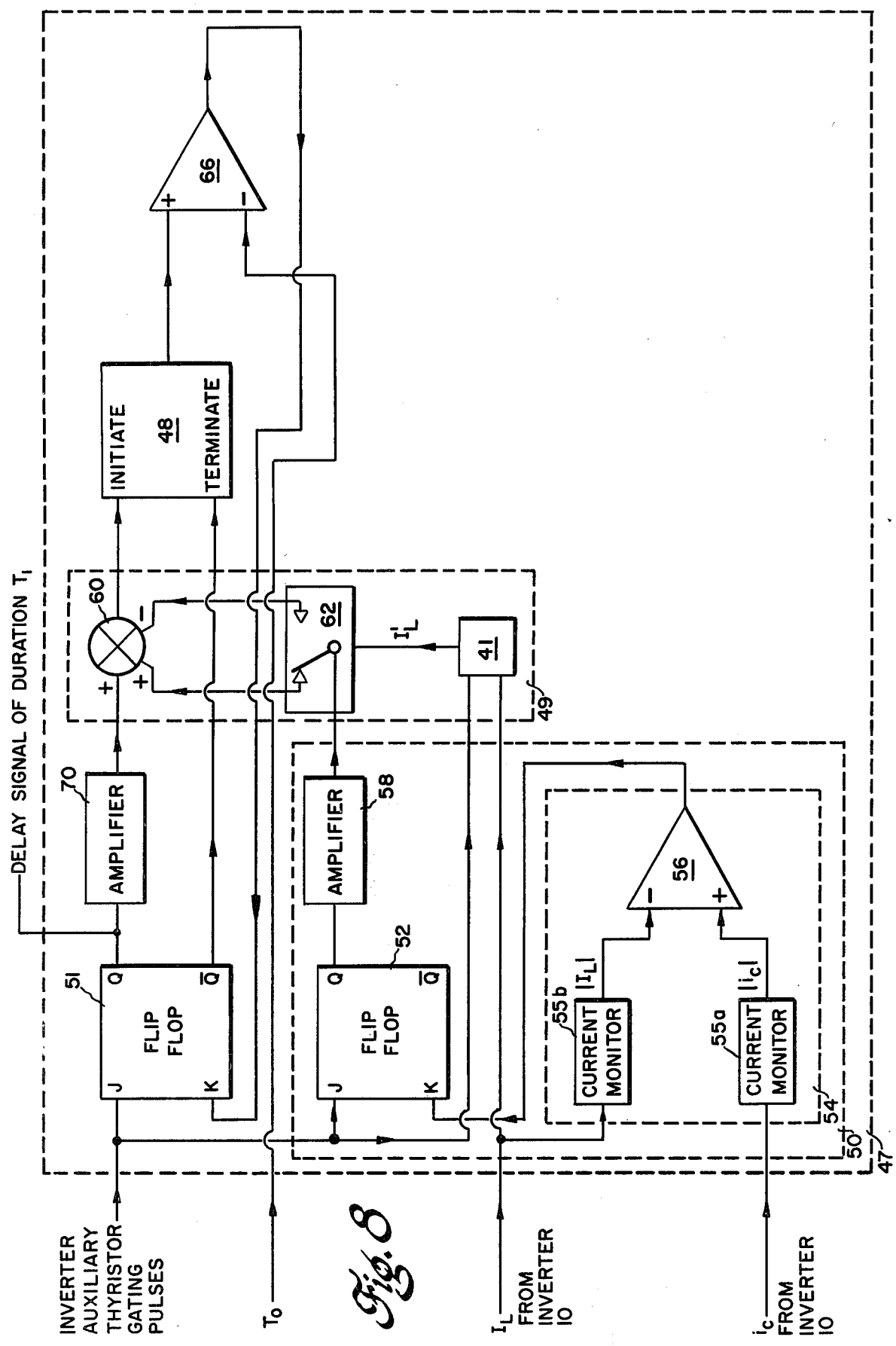
FIG. 8 is a block diagram of an alternate embodiment of an adjustable delay controller according to the present invention.

FIG. 8 shows an alternative embodiment 47 of an adjustable firing delay controller for varying the inverter firing time delay interval in accordance with the alternate procedure set forth above. Adjustable firing time delay controller 47 includes timing duration signal generating means, shown as ramp generator 48. Ramp generator 48 produces a continuously increasing amplitude signal whose slope varies in accordance with the amplitude of the initiate signal impressed at its initiate input. This continuously by increasing amplitude signal is terminated and ramp generator 48 is reset in response to a terminate signal supplied to the ramp generator terminate input.

The slope of the continuously increasing signal generated by ramp generator 48 is varied proportionately to the magnitude ($L_d/L$) in response to the initiate signal supplied by summing means 49 from signals generated by reference signal generator 50 and a bistable triggering means shown as a J-K flip-flop 51. Reference signal generator 50 comprises a J-K flip-flop 52 which is coupled at the J input to inverter 10 shown in FIG. 1 to receive auxiliary thyristor gating pulses. The K input of flip-flop 52 is coupled to a current sensor 54 which, in response to signals proportional to inverter load current $I_L$ and inverter commutation current $i_c$ derived from current transformers (not shown) coupled to inverter 10, provides a signal having the duration of $|t_e'|$ as defined above.

Current sensor 54 includes a pair of current monitors 55a and 55b, each configured of a full wave bridge rectifier circuit, which in response to signals proportional to $i_c$ and $I_L$, provide signals proportional to $|i_c|$ and $|I_L|$ respectively. The output signals of current monitors 55a and 55b are supplied to the first and second inputs of comparator 56. Comparator 56, in accordance with signals supplied from current monitors 55a and 55b, supplies a logic signal in accordance with the difference between $|I_L|$ and $|i_c|$ to the K input of flip-flop 52.

An amplifier 58, having a gain adjusted to the value $L_d/L$, couples the Q output of flip-flop 52 to summing means 49. As will be better understood by reference to the operation of alternate adjustable delay controller 47, during intervals when $|i_c| \leq |I_L|$, that is during the interval of duration $|t'_e|$, the Q output signal of flip-flop 52 goes "high", causing amplifier 58 to supply a signal proportional in magnitude to $L_d/L$ to summing means 49 which results in the slope of the signal generated by ramp generator 48 being incremented or decremented accordingly.

Summing means 49 comprises a three input summing amplifier 60 having a first and a second noninvert input, an invert input and an output, the output being coupled to the initiate input of ramp generator 48. An electronic switch 62 couples the output of amplifier 58 between an invert and noninvert input of summing amplifier 60 according to whether the inverter commutation sequence type is necessary or redundant, respectively, as determined by a signal generated by polarity processor 41 in accordance with polarity of inverter load current $I_L$ and auxiliary thyristor gating pulses supplied thereto by inverter 10.

The output of ramp generator 48 is coupled to the first input of a second comparator 66, the second input of which is coupled to receive a reference signal from an external source (not shown) which is proportional to the fixed-value term $T_o$, defined earlier. Comparator 66 provides, in accordance with the difference in magnitude between input signals received at the first and second comparator inputs, a logic signal which is supplied to K input of flip-flop 51. The J input of flip-flop 51 is coupled to inverter 10 shown in FIG. 1 to receive inverter auxiliary thyristor gating signals. The Q and $\overline{Q}$ outputs of flip-flop 51 are coupled to the input of an amplifier 70, adjusted with unit gain and to the terminate input of ramp generator 48, respectively. When the J and K input signals to flip-flop 51 are at a logical "1" and logical "0" voltage level, respectively, the flip-flop Q output signal is forced "high" providing a delay signal to inverter 10 to delay conduction of the remaining nonconductive one of main thyristors 12a and 12b and also providing an initiate signal which is coupled through summing means 49 to the initiate input of a ramp generator 48. When the J and K input signals supplied to J-K flip-flop 51 are at a logical "0" and logical "1" voltage level, respectively, the $\overline{Q}$ output signal is driven "high" and the Q output signal goes "low", causing the delay signal supplied to inverter 10 to be interrupted and an inverter main thyristor to be fired. Also, when the Q output signal of flip-flop 51 goes "low", the ramp signal of ramp generator 48 is terminated. Thus, flip-flop 51 controls the initiation and termination of the ramp signal.

Figure 9A:
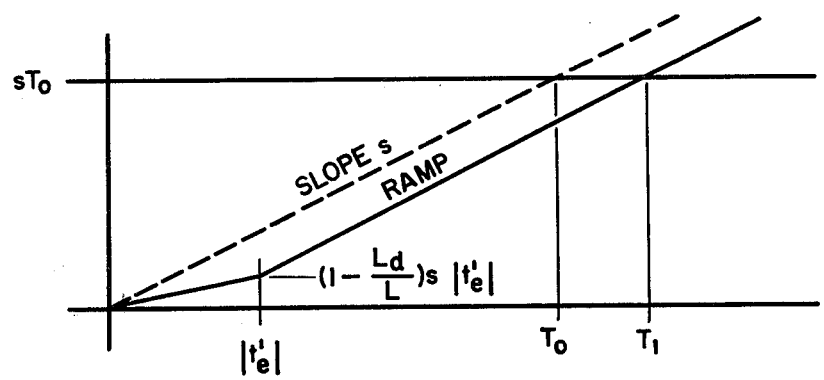
FIGS. 9a and 9b, respectively, are graphical representations illustrating operation of the adjustable delay controller of FIG. 8 for a necessary commutation and redundant commutation, respectively.
Figure 9B:
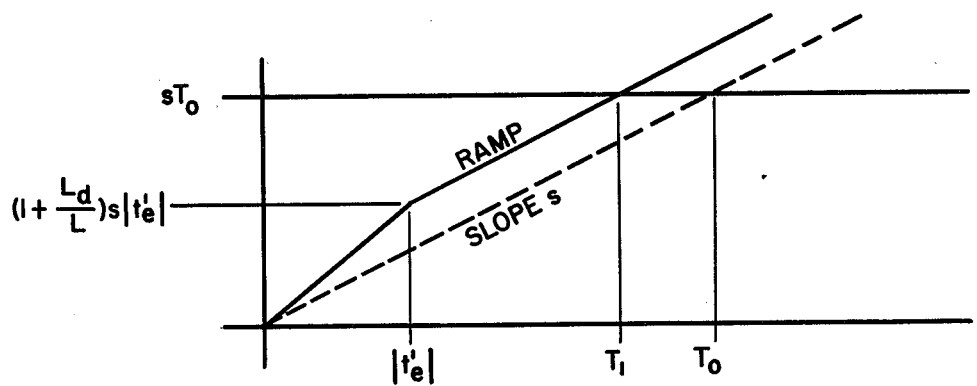

Operation of the alternate delay controller 47 shown in FIG. 8 may be best be understood with reference to FIGS. 9a and 9b. Initially, it is assumed that the output signals of comparators 56 and 66 are "low" and both of the inverter auxiliary thyristors are nonconductive, resulting in the J and K input signals to flip-flops 51 and 52 both being at a logical "0" voltage level. When an auxiliary thyristor within inverter 10 of FIG. 1 is gated into conduction to commutate a then-conductive main thyristor, the corresponding J input signal to flip-flops 51 and 52 both reach a logical "1" voltage level, causing the respective Q output signal of each flip-flop to go "high". When the Q output signal of flip-flop 51 is "high", a signal is provided to inverter 10 for delaying conduction of a remaining nonconductive inverter main thyristor. Additionally, when the Q output signal of flip-flop 51 is "high", ramp generator 48 receives an initiate signal via amplifiers 70 and 60 and, in response, supplies a ramp signal. With the Q output signal of flip-flop 52 "high" at this time, the initiate input signal to ramp generator 48 is incremented or decremented by the proportion $L_d/L$ according to the polarity of the processed inverter load current signal $I_L'$ as determined by polarity processor 41 in accordance with the polarity of the inverter load current and inverter load voltage. Thus, when inverter load voltage and load current have the same polarity corresponding to a necessary commutation sequence, polarity processor 41 causes analog switch 62 to couple the output of amplifier 58 to the first invert input of summing amplifier 60, resulting in the slope of the ramp signal being decremented accordingly as shown in FIG. 9a. Similarly, when the inverter load voltage and load current have the opposite polarity, corresponding to a redundant commutation sequence, the slope of the ramp signal of ramp generator 46 is incremented proportional to $L_d/L$, as shown in FIG. 9b. The slope of the ramp signal continues to be incremented or decremented as described above during an interval of duration $|t_e'|$ corresponding to the condition $|i_c| < |I_L|$. When $|i_c|$ equals $|I_L|$, the output signal of comparator 56 goes "high", causing flip-flop 52 to transition and drive its $\overline{Q}$ output signal "high". The ramp signal amplitude of ramp generator 48 continues to increase, but at a fixed slope s, until the amplitude of the ramp signal equals the product of the slope s and the amplitude of the fixed value reference signal $T_o$, at which time the output signal of comparator 66 goes "high", causing flip-flop 51 to again transition. With the Q output signal of flip-flop 51 now "high", ramp generator 48 is discharged and the delay signal to inverter 10 is interrupted, resulting in the then nonconductive main thyristor within the inverter being gated into conduction.

The operation of adjustable firing delay time controller 47 may be improved slightly by amplifying the output signal of current monitor 55a, with respect to that of current monitor 55b. This results in a decrease in magnitude of the time interval $|t_e'|$ and a closer approximation of equation (8) to equation (9).

The foregoing description concerning a method and associated apparatus for controlling the inverter firing time delay interval has been directed only to a single phase inverter. In many instances, it is desirable to excite a polyphase load, such as a synchronous machine, from a single voltage source, thus necessitating a plurality of individual single phase inverter circuits, each coupled across the voltage source to conduct alternating current to each respective phase of a polyphase load.

Figure 10:
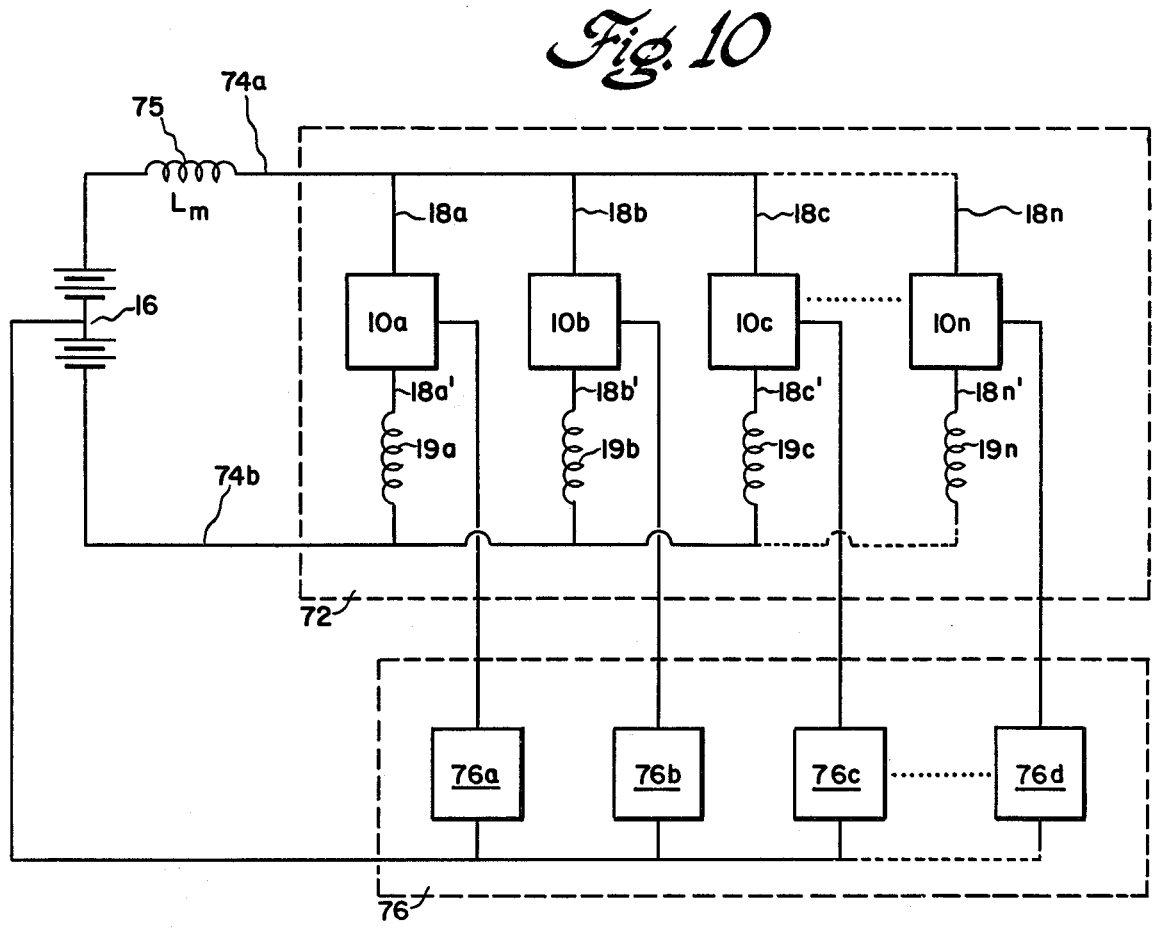
FIG. 10 is a block schematic diagram of a polyphase inverter embodying a plurality of single phase McMurray-type inverters.

FIG. 10 shows a polyphase inverter 72 coupled to a voltage source such as a DC source 16, by conductors 74a and 74b. Inverter 72 is typically comprised of a plurality of individual McMurray type phase inverters 10a, 10b, 10c, ... 10n, corresponding in number to N, the number of phases of a polyphase load 76, each inverter conducting current to one of machine phases 76a, 76b, 76c ... 76n, respectively. Each of phase inverters 10a, 10b, 10c ... 10n is coupled by a respective pair of phase inverter conductors 18a and 18a', 18b and 18b', 18c and 18c' ... 18n and 18n', to conductors 74a and 74b, respectively, so as to be coupled across source 16. To simplify the analysis of inverter 72, the total inductance of each respective pair of phase inverter conductors, such as 18a and 18a' is represented as a single lumped inductance, such as 19a, having a magnitude $L_i$. Similarly, the total inductance of conductors 74a and 74b is represented as a single lumped inductance 75 having a magnitude $L_m$.

By reference to FIGS. 2c, 2e, 2f and 2g, it may be observed that each single phase inverter, such as 10a of FIG. 10, when undergoing commutation, disturbs the respective input voltage applied across each of remaining phase inverters 10b, 10c ... 10n, if inverter 10a is in topology modes 3, 5, 6 or 7. However, this effect will be small unless two or more phase inverters are undergoing simultaneous commutations. Under conditions when only one of phase inverters 10a-10n, such as 10a, is undergoing commutation, it can be deduced from examination of FIGS. 2c and 10 that the magnitude of the total inductance that spans DC source 16 during inverter 10a topology mode 3 intervals is the sum of $L_i$, the magnitude of inductance 19a associated with inverter 10a, and $L_m$, the magnitude of the lumped phase inductance of conductors 74a and 74b. Thus, the analysis given previously for the single inverter case remains valid with the expression $L_m + L_i$ being substituted for the term $L_d$ yielding $$L_m + L_i = L_d \tag{14}$$

When two or more individual phase inverters, such as phase inverters 10a and 10b shown in FIG. 10, undergo simultaneous commutation, no interference exists between phase inverters if only one of them, such as 10a, is in one of topology modes 3, 5, 6 and 7 because the lumped phase inductance, such as 19a, associated with phase inverter 10a, will have no effect on other phase inverters, such as 10b, when they undergo commutation and are in a mode other than topology modes 3, 5, 6 and 7.

The greatest interference between individual phase inverters undergoing simultaneous commutation results if two or more phase inverters, such as 10a and 10b are both in topology modes 3 or 7. This is because the individual lumped phase inductance, such as 19a, associated with an individual phase inverter, such as 10a, effectively spans source 16 and inductance 75 while current is transferred through an inverter main thyristor of another inverter. For N phase inverters, each in topology mode 3 or 7, the voltage $E_i$ across each of individual phase inductances 19a, 19b, 19c ... 19n is given by the expression $$E_i = E_d L_i / (NL_m + L_i) \tag{15}$$

and the rate of current transfer through each individual phase inductance will be given by $$di/dt = E_i/L_i = E_d/(NL_m = L_i) \tag{16}$$

The time $\Delta t$ to transfer a current $\Delta i$ is given by $$\Delta t = \Delta i (NL_m + L_i)/E_d \tag{17}$$

Thus, as can be observed from equation (17), the effect of two or more individual phase inverters, such as 10a and 10b, undergoing commutation and simultaneously being in topology mode 3 or 7, is an increase in the time $\Delta t$ required for current transfer through the previous nonconductive main thyristor of each inverter. Extending the time required for current transfer may result in a previously nonconductive inverter main thyristor being fired prematurely, causing the inverter to revert to an undesirable topology mode sequence.

Some interference also occurs if two or more individual phase inverters undergoing simultaneous commutation are each either in the mode 5 topology state (the capacitor charging interval) or the topology state mode 6 (the capacitor discharging interval). The effect of this interference is small because only the voltage difference between source 16 voltage $E_d$ and the voltage across each internal phase inverter capacitance appears across the associated one of lumped inductances 19a, 19b, 19c ... 19n, respectively. Because the net effect of such interference is small, it will be neglected to simplify the analysis presented below.

As previously noted, the performance of a single phase inverter can be improved, and undesirable toplogy mode 7 intervals can be eliminated, by varying the inverter firing time delay $T_1$ such that the mode 3-mode 5 interface occurs at a fixed time interval $T_x$ after commencement of commutation. It may, therefore, be assumed that significant mutual interference occurs only when two or more phase inverters such as, for example, 10a and 10b, each in topology mode 3, undergo simultaneous commutation, and that such interference can be nullified by adjusting the inverter firing delay interval for each phase inverter to compensate for the reduced current transfer so that the mode 3-mode 5 interface for each phase inverter occurs at a fixed time interval $T_y$ after commencement of commutation. To simplify the analysis, only two individual phase inverters, such as inverters 10a and 10b, will initially be assumed to be mutually interfering at a specific time.

Figure 11A:
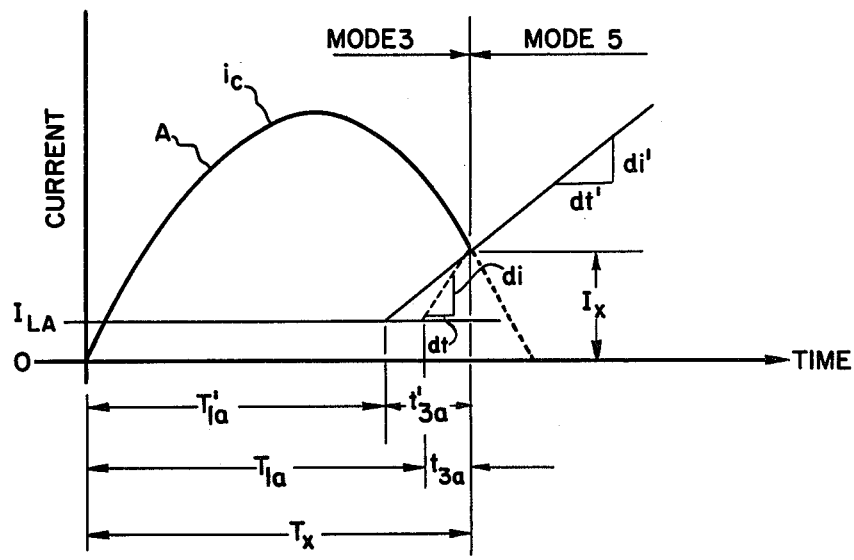
FIGS. 11a and 11b, 12a and 12b and 13a and 13b are graphical representations, with respect to time, of inverter commutation current for each of two single phase inverters of the polyphase inverter of FIG. 10, illustrating mutual inverter interference.
Figure 11B:
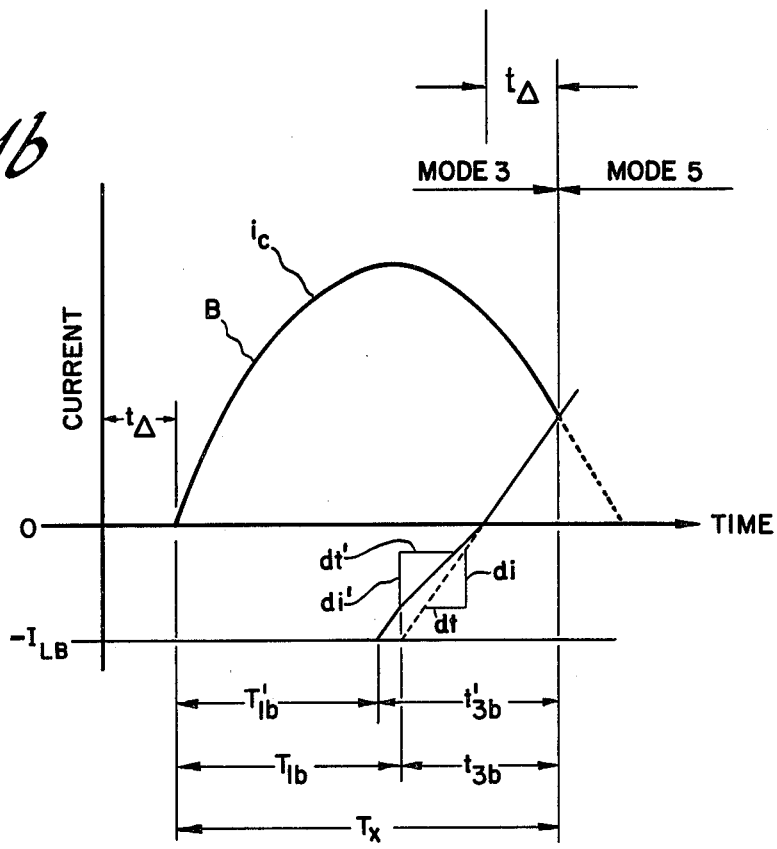

FIGS. 11a and 11b illustrate the commutation current waveforms designated A and B, respectively, for two mutually interfering phase inverters such as phase inverters 10a and 10b, respectively, of FIG. 10. The condition shown is one of complete overlap during simultaneous occurrence of the mode 3 topology modes within each inverter as occurs when load current $I_{LA}$ supplied by phase inverter 10a exceeds load current $I_{LB}$ supplied by phase inverter 10b. During the interval of simultaneous mode 3 topology states within each of inverters 10a and 10b, the actual rate of current transfer $di'/dt'$ through the previously nonconductive main thyristor of each inverter, as represented by the slope of the thickened line segment, is smaller than the rate of current transfer $di/dt$, represented by the slope of the dashed line segment, as would occur when the mode 3 topology states of each inverter are not simultaneous.

To improve operation of polyphase inverter 72 of FIG. 10, it is presumed that it is desired to vary the respective inverter firing time delay intervals of each of indivudal phase inverters 10a-10n, respectively, such that the topology mode 3-5 interface for each inverter occurs at a fixed time $T_x$ after initiation of inverter commutation, as discussed above. Without mutual inverter interference, the duration of the mode 3 transfer intervals $t_3$ for each inverter (defined as the difference between $T_x$ and $T_1$) are given by substituting the value of $L_d$, as derived in equation (14), into the last term of equation (3) yielding $$t_{3a} = (L_m + L_i)(I_x - I_{LA})/E_D \tag{18}$$

$$t_{3b} = (L_m + L_i)(I_x - I_{LB})/E_d \tag{19}$$

where $t_{3a}$ and $t_{3b}$ are the mode 3 transfer intervals for phase inverters 10a and 10b, respectively. Noting that $T_1$ equals the difference between $T_x$ and $t_3$ it will become apparent in comparison with equation (3), that the firing delay time for each of non-interfering phase inverters 10a and 10b of FIG. 10 must be advanced in proportion to the tern $L_m + L_i$.

For the case of two mutually interfering phase inverters, equation (17) prevails during the time when both inverters are in topology mode 3. Thus, the $t_3$ transfer interval for phase inverter 10a, denoted as $t'_{3a}$ is, under the conditions depicted in FIG. 11a, given by $$t'_{3a} = (2L_m + L_i)(I_x - I_{LA})/E_d$$

or $$t'_{3a} = t_{3a} + t_{3a}[L_m/(L_m + L_i)] \tag{20}$$

Mutual interference between phase inverters 10a and 10b of FIG. 10 causes the same rate of current transfer in inverter 10b as in phase inverter 10a during the time interval t'$_{3a}$, with the current rise during the remaining time interval occurring at the normal rate. Thus, the t$_3$ transfer interval for inverter 10b, denoted as t'$_{3b}$ under conditions depicted in FIG. 11b.

$$t'_{3b} = t'_{3a} + (L_m + L_i)[(I_x - I_{LA})]/E_d$$

or $$t'_{3b} = t_{3b} + t_{3a}L_m/(L_m + (I_x - I_{LB}) - L_i \quad (21)$$

To compensate for this case of two mutually interfering phase inverters, the individual firing delay time intervals T$_1$ for each inverter must be advanced by the factor $L_m(I_x - I_{LA})/E_d$.

By inspection of FIGS. 11a and 11b, the range of the time interval t$_\Delta$ between the beginning of commutation in phase inverter 10a and the beginning of commutation in phase inverter 10b which causes the mode 3 interval of phase inverter 10b to completely overlap the mode 3 interval of phase inverter 10a can be seen to be $$0 < t_\Delta < t'_{3b} - t'_{3a}$$

or $$0 < t_\Delta < t_{3b} - t_{3a}$$

or $$0 < t_\Delta < (L_m + L_i)(I_{LA} - I_{LB})/E_d \quad (22)$$

For values of t$_\Delta$ < 0 or t$_\Delta$ > t$_{3b}$ − t$_{3a}$, partial overlap of the mode 3 current transfer intervals occur. Negative values of t$_\Delta$ imply that phase inverter 10b commutates prior to phase inverter 10a.

The case of partial overlap of the mode 3 current transfer intervals for the conditions $I_{LA} > I_{LB}$ and $I_{LA} < I_{LB}$ are illustrated in FIGS. 12a and 12b and 13a and 13b, respectively. From observation of FIGS. 12b, the mode 3 current transfer interval t'$_{3b}$ for phase inverter 10b can be calculated as follows. After current transfer (mode 3) in phase inverter 10a of FIG. 10 is completed, current transfer in phase inverter 10b of FIG. 10 continues at its normal rate for a time interval equal to t$_\Delta$. The magnitude of the current transferred, I$_{66}$, transferred during t$_\Delta$, is given by the expression:

$$I_\Delta = E_d t_\Delta / (L_m + L_i) \quad (23)$$

The current ΔI, transferred during the prior overlap condition can be expressed as:

$$\Delta I = I_X - I_{LB} - I_\Delta \quad (24)$$

with the time required for such transfer given by equation (17) with N=2. Thus, from equation (17), (23) and (24), the current transfer interval t'$_{3b}$ is given by $$t_{3b}' = \left( I_x - I_{LB} - \frac{E_d t_\Delta}{L_m + L_i} \right) \left( \frac{2L_m + L_i}{E_d} \right) + t_\Delta \quad (25)$$

Manipulating equation (25) together with equation (19) yields the relationship $$t_{3b}' = t_{3b} + (t_{3b} - t_\Delta)\left( \frac{L_m}{L_m + L_i} \right) \quad (26)$$

Figure 12A:
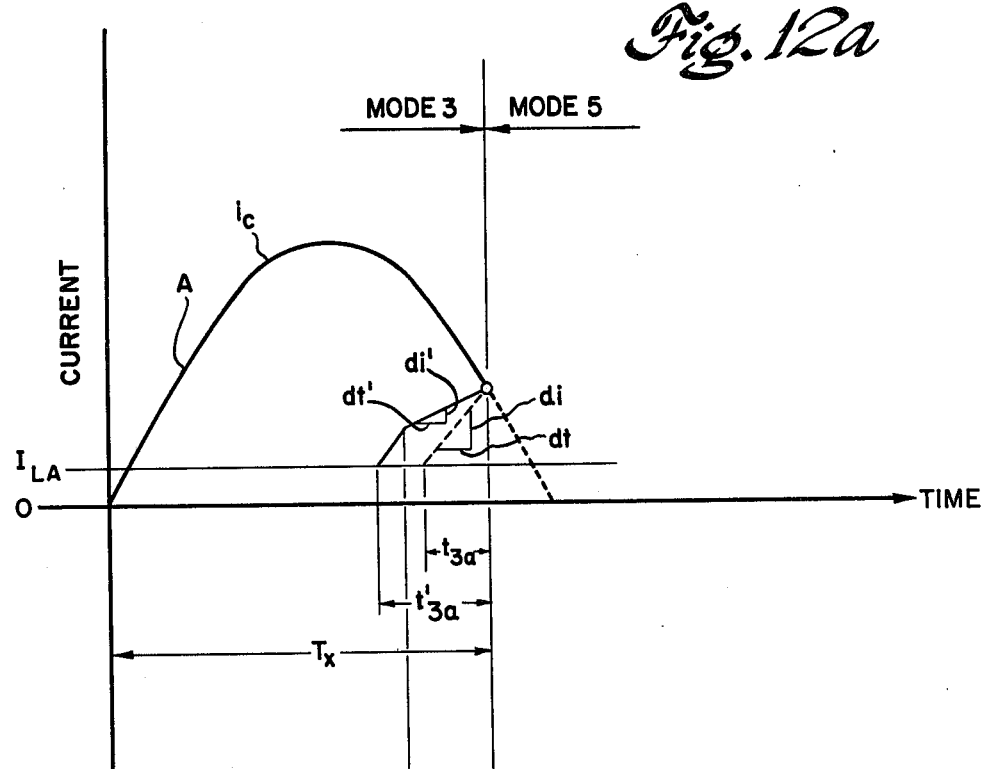

Similarly, under conditions depicted in FIG. 12a, the transfer interval t'$_{3a}$ will be advanced by the same amount [(t$_{3b}$ − t$_\Delta$) L$_m$/(L$_m$ + L$_i$)] yielding $$t'_{3a} = t_{3a} + (t_{3b} - t_\Delta)L_m/(L_m + L_i) \quad (27)$$

Figure 12B:
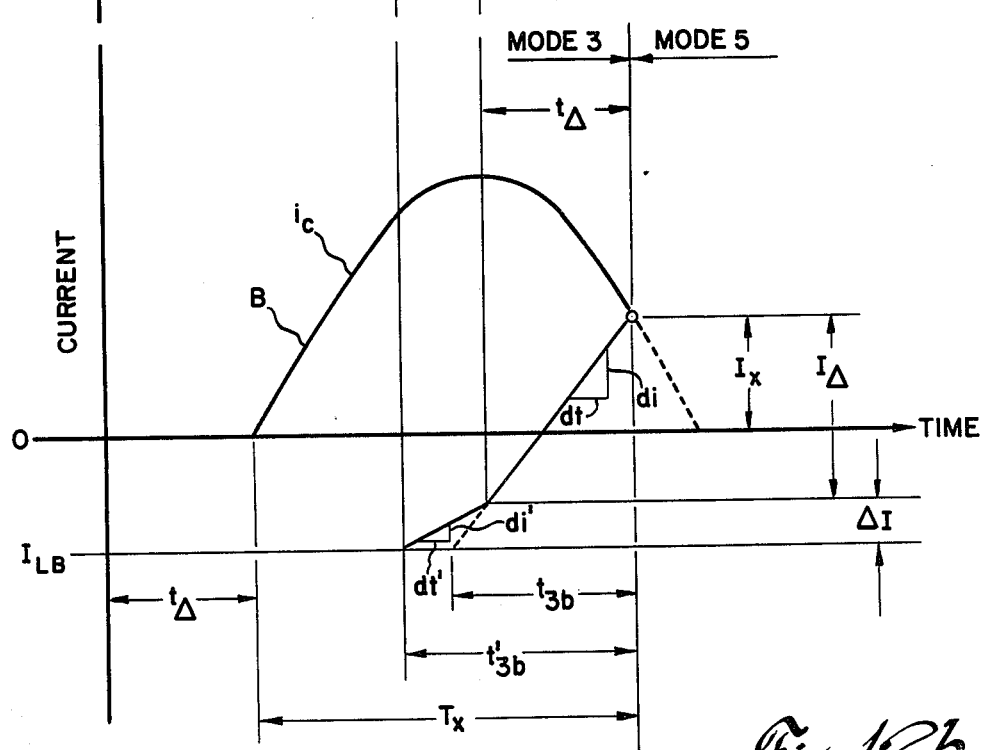

It will be evident from FIGS. 12a and 12b that equations (26) and (27) will prevail over the interval when $$t_{3b} - t_{3a} < t_\Delta < t_{3b} \quad (28)$$

because no overlap of the mode 3 intervals occurs when t$_\Delta$ > t$_{3b}$.

Figure 13A:
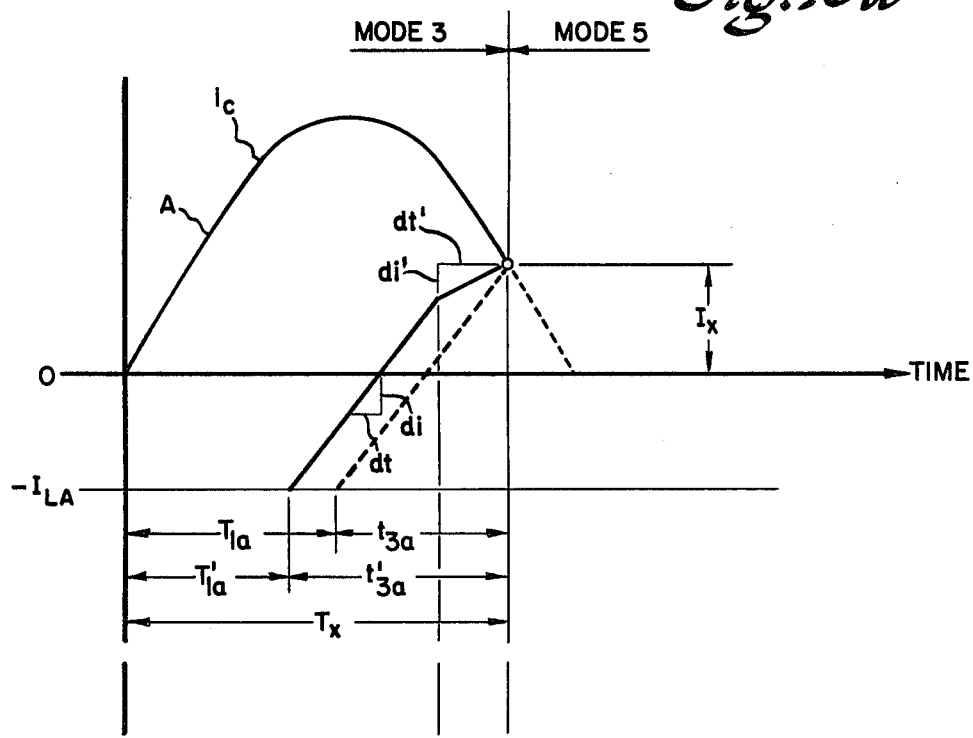
Figure 13B:
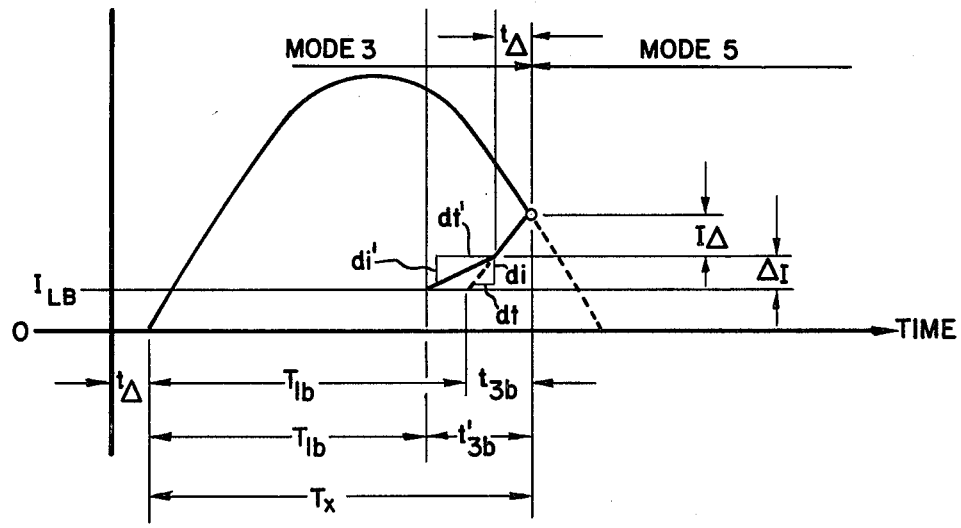

From FIGS. 13a and 13b, it can be observed that the respective mode 3 time intervals t'$_{3b}$ and t'$_{3a}$ for the condition $I_{LA} < I_{LB}$, are also given by equations (26) and (27), except that the range of validity is now $$0 < t_\Delta < t_{3b} \quad (29)$$

To compute the firing delay according to the above method for the respective inverter load current conditions, inverter interference must be predicted prior to its occurrence, the correct copensation must be computed, and the inverter firing time delay intervals must be adjusted accordingly.

Referring now to FIG. 14, an adjustable firing time delay controller 100 for controlling the time delay intervals for two mutually interfering phase inverters, such as 10a and 10b within polyphase inverter 72 of FIG. 10, includes two identical single phase adjustable firing time delay controllers 134a and 134b, respectively. As each of delay controllers 134a and 134b are configured identically, only the details of delay controller 134a are set forth. Delay controller 134a includes a ramp generator 136 for generating a fixed slope ramp signal at terminal 137 in response to an initiate signal impressed at the initiate input. In turn, ramp generator 136 is reset, and the output signal is terminated in response to a terminate signal impressed at the terminate input.

A reference inverter firing delay signal generating means 138 is provided to generate a reference inverter firing delay signal proportional in duration to the interval T$_1$ as defined earlier. Reference inverter firing delay signal generator 138 as shown within delay controller 134, includes a divider 140 which is coupled to a respective one of phase inverters 10a and 10b for receiving a signal derived from a current transformer (not shown) proportional to the phase inverter load current and a voltage proportional to the inverter source voltage E$_d$. Divider 140, in response to input signals proportional to inverter load current and inverter source voltage, provides a signal at the output proportional to the magnitude ratio of inverter load current to inverter source voltage. To insure that the polarity of the inverter load current signal received by divider 140 is adjusted so that the polarity of the divider output signal remains appropriate to the respective inverter commutation sequences (necessary or redundant), a polarity processor 141, comprised of a polarity inverter 141a shunted by an electronic switch 141b responsive to inverter auxiliary thyristor gating pulses, is coupled between the current transformer and divider 140 to adjust the polarity of load current signal supplied to divider 140. During intervals when the inverter load voltage and load current have opposite polarity, (corresponding to a redundant commutation), electronic switch 141b remains open, causing polarity inverter 141a to invert the phase inverter load current signals supplied to divider 140, while during intervals when the inverter load voltage and load current have the same polarity (a necessary inverter commutation), switch 141b is "closed", shunting the polarity inverter, therby causing the polarity of the load current signal supplied to divider 140 to be unaffected.

The output of divider 140 is coupled to the first or invert input of a summing amplifier 142 while the second or noninvert input of summing amplifier 142 is coupled to receive a fixed value reference signal from an external source (not shown) proportional in amplitude to the expression $L_d I_X/E_d$. Summing amplifier 142 provides, at output terminal 143, an intermediate reference signal proportional in amplitude to the expression $L_d(I_X-I_L^*)/E_d$, where $I_L^*$ is the phase inverter load current supplied by an associated one of phase inverters 10a and 10b of FIG. 10. The output signal provided by summing amplifier 142 is supplied to the first invert input of a second summing amplifier 144. A reference signal from another external source (not shown) proportional in magnitude to the duration of $T_X$, is impressed at a noninvert input of summing amplifier 144, while the second invert input 147 is coupled to receive a ramp compensation signal proportional to $L_m/L_d$. Summing amplifier 144 yields a reference inverter firing delay signal proportional to the difference between the sum of the signals supplied to the first and second invert inputs, and the input signals supplied to the noninvert input.

A comparator 148 is coupled to receive the output signals from summing amplifier 144 and from ramp generator 136 and provides a logical signal, responsive to the difference in magnitude therebetween, to the K input of a JK flip-flop 150. The J input of flip-flop 150 is coupled to receive auxiliary thyristor gating pulses from inverter 10a coupled to polarity processor 141. Flip-flop 150 is coupled at the Q output 152 to inverter 10a and to the initiate input of ramp generator 136. When the input signals impressed on the J and K inputs of flip-flop 150 are "high" and "low", respectively, flip-flop 150 supplies a signal at the Q output, proportional in duration to the time interval $T_1$, to inverter 10a to delay the conduction of an inverter main thyristor and to initiate operation of ramp generator 136. Flip-flop 150 is also coupled at the $\overline{Q}$ output 154 to the terminate input of a ramp generator 136 and provides a signal to terminate the ramp signal generated by ramp generator 136 when the J and K input signals to flip-flop 150 are "low" and "high", respectively.

A pair of compensation triggers 156a and 156b are provided for determining the presence of interference between phase inverters 10a and 10b of FIG. 10 and for subsequently triggering a compensation signal generator (described hereinafter) during the interval of interference between phase inverters. Compensation triggers 156a and 156b are identical, and therefore, only the details of compensation trigger 156a are set forth. Compensation trigger 156a comprises a comparator 158 and a JK flip-flop 160. The first input 159a of comparator 158 of input compensation trigger 156a is coupled to ramp generator output 137 of delay controller 134a while the second compensation trigger comparator input 159b is coupled to the summing amplifier output terminal 143 of delay controller 134b. Likewise, the first comparator input 159a to compensation trigger 156b is coupled to ramp generator output 137 of delay controller 134b while the second compensation trigger comparator input 159b is coupled to summing amplifier output 143 of delay controller 134a. The K input of flip-flop 160 is coupled to the output of comparator 158 while the J flip-flop input is coupled to receive the delay signal from delay controller 134a. The time interval during which the Q output signal of each flip-flop within each of compensation triggers 156a and 156b, respectively, is at a logical "1" voltage level corresponds to the time interval during which each of adjustable delay controllers 134a and 134b must be compensated to reduce mutual inverter interference. The output signals from compensation triggers 156a and 156b are supplied to the inputs of a two-input NAND gate 164, the output of which is coupled to the initiate input of a compensation signal generator 166.

Compensation signal generator 166, comprised of a ramp generator 168 coupled to a compensation amplifier 170 having gain proportional to $L_m/L_d$, provides, in response to an input signal at the initiate input, a compensation signal to reduce the inverter firing delay interval, which signal is impressed at the second invert summing amplifier input 147 of delay controllers 134a and 134b. Compensation ramp generator 168 is reset, and its output signal is terminated, in response to a terminate signal provided at output 154 of each of dealy controllers 134a and 134b, respectively, as received through NAND logic gate 172.

Operation of adjustable delay controller 100 will now be set forth, it being assumed that the J and K input signals to flip-flops 150 and 160, respectively, are each initially "low" and that each of ramp generators 136 and 168 is discharged. To simplify discussion of the operation of adjustable delay controller 100, it will also be assumed that the auxiliary thyristor within each of a pair of single phase inverters, such as 10a and 10b, respectively, as shown in FIG. 10, is fired simultaneously to commutate a respective then-conductive main inverter thyristor.

When the corresponding auxiliary thyristor within each of inverters 10a and 10b, respectively, of FIG. 10, is gated into conduction, the signal at the J flip-flop input of each of delay controllers 134a and 134b, respectively, is driven to a logical "1" voltage level forcing the Q output signal of each flip-flop "high". When the flip-flop Q output signal is "high", each of delay controllers 134a and 134b generates a delay signal at output terminal 152 which is supplied to an associated inverter to delay current conduction of the remaining main nonconductive thyristor. The flip-flop within each of compensation triggers 156a and 156b transitions in response to the presence of a delay signal received at the respective J input, thus initiating operation of ramp generator 168 of compensation generator 166. Compensation ramp generator 168 thereupon generates a compensation ramp signal which, when amplified by amplifier 170, has a slope proportional to $L_m/L_d$. This signal is supplied to the second summing amplifier input terminal 147 of delay controllers 134a and 134b, respectively. If the amplitude of the reference inverter firing delay signal generated within each delay controller equals to the amplitude of the ramp signal, then the delay signal at output terminal 152 of each delay controller goes "low", resulting in a previously nonconductive main thyristor within a corresponding inverter being gated into conduction and each of ramp generators 136 and 166 being reset.

During the interval when the reference inverter firing delay signal amplitude exceeds the amplitude of the ramp generator output signal, the reference inverter firing delay signal is continuously decremented proportional to $L_m/L_d$ to advance the firing delay interval to compensate for mutual inverter interference until such time as the amplitude of the intermediate reference signal provided at output 143 of delay controller 134b exceeds the magnitude of the ramp signal of delay controller 134a, or vice versa, representing the end of the mutual inverter interference. When this occurs, the output signal of one or both of the compensation triggers goes "low", thus fixing the amplitude of the compensation signal from compensation signal generator 166 at a constant level.

When the amplitude of the ramp signal exceeds the now-fixed reference inverter firing delay signal within each of delay controllers 134a and 134b, delay signals produced by the respective delay controller are interrupted. This, in turn, results in a previously nonconductive main thyristor within the corresponding one of inverters 10a and 10b, respectively, shown in FIG. 10, being gated into conduction. With the $\overline{Q}$ output signal at the discharge output 154 of each of the delay controllers 134a and 134b now "high", the delay controller ramp generators and compensation ramp generator 166 are reset and the corresponding ramp signals are terminated.

Although the operation of delay controller 100 has been described assuming that the auxiliary thyristor within each of inverters 10a and 10b of FIG. 10 are fired simultaneously, it will be evident to those skilled in the art that the operation of adjustable delay controller 100 is not so limited. Rather, adjustable delay controller 100 is effective for reducing mutual inverter interference, according to the principles described above, regardless of whether the auxiliary inverter thyristors are fired simultaneously or are fired at different time intervals.

The basic principle of operation of the adjustable delay controller 100 which provides compensation for two mutually interfering phase inverters, may be extended to realize an adjustable delay controller for compensation of N (where N is an integer greater than 2) individual mutually interfering phase inverters such as 10a, 10b, 10c, ... 10n, respectively, within inverter 72 as shown in FIG. 10.

In FIG. 15, an adjustable polyphase delay controller 175 for providing compensation for three mutually interfering individual phase inverters includes three single phase adjustable delay controllers 134a, 134b and 134c, respectively, configured as described in conjunction with FIG. 14 and each being coupled to receive signals corresponding to source voltage $E_d$, inverter phase load currents $I_{LA}$, $I_{LB}$ and $I_{LC}$, respectively, reference signals proportional to $T_X$ and $L_d L_X/E_d$, and a compensation signal. Each single phase delay controller provides at its respective delay signal output 152, a delay signal of duration $T_1$ to a respective phase inverter for controlling current conduction through a remaining nonconductive thyristor. The ramp signal at output terminal 137 of each of delay controllers 134a through 134c, respectively, is impressed at the corresponding first comparator input 159a of a respective one of compensation triggers 156a through 156c, while the J input of each compensation trigger is adapted to be coupled to the delay signal output 152 of the same one of delay controllers 134a through 134c, respectively.

Each of compensation triggers 156a-156c receives via a respective one of summing amplifiers 180a-180c, intermediate reference signals produced at the intermediate reference signal output 143 of those other delay controllers controlling a then co-interfering phase inverter. Thus for example, when each of phase inverters 10a, 10b and 10c is undergoing cummutation and is in the mode 3 topology mode, compensation triggers 156a-156c each receive intermediate reference signals from delay controllers 134b and 134c, 134a and 134c and 134a and 134b, respectively. Each of electronic switches 182a-182c, responsive to the delay signal generated by an associated one of delay controllers 134a-134c, couples the reference signal output 143 to a separate input of each of a pair of summing amplifiers 180a-180c, respectively, so that when the associated one of inverters 10a-10c is not interfering with another inverter, no intermediate reference signals are supplied from delay controllers 134a, 134b and 134c to compensation triggers 156b and 156c, 156a and 156c and 156a and 156b, respectively.

The output of each of compensation triggers 156a-156c is coupled to the first input of a respective one of NAND logic gates 164a, 164b and 164c, the second input of logic gates 164a-164c being coupled to the first input of logic gates 164b, 164c and 164a, respectively. The outputs of logic gates 164a-164c are coupled to the initiate input of compensation generator 166. In response to a logic signal generated by any of compensation trigger pairs 156a and 156c or 156b and 156c or 156c and 156a, compensation generator 166 becomes charged, providing a compensation ramp signal of slope $L_m/L_d$ to the compensation input terminal 147 of each of delay controlers 134a-134c. When supplied with a compensation ramp signal, each delay controller advances the delay signal supplied to the associated inverter to compensate for mutual inverter interference. Compensation generator 166 is discharged and the ramp output signal is terminated in response to discharge signals supplied from the dishcarge output 154 of delay controllers 134a, 134b and 134c as received through a three input NAND logic gate 172.

For the case of N phase inverters, the number of two input logic gates, Z, required for combining the output signals of each of the N compensation triggers to provide the appropriate logic signal for triggering compensation generaor 166 is given by:

$$Z = \sum_{i=1}^{N} (i - 1) \tag{30}$$

Operation of polyphase adjustable delay controller 175 will now be set forth. For purposes of simplicity, it will be assumed that phase inverters 10a-10c simultaneously undergo phase commutation. When each of the phase inverters 10a-10c commences commutation, an auxiliary thyristor gating signal is received by a corresponding one of single phase delay controllers 134a, 134b and 134c, respectively, causing each of them to produce a delay signal at delay output 152 which results in the delay of conductive of a main thyristor within an associated one of phase inverters 10a-10c. When a delay signal is present at the delay output 152 of each of delay controllers 134a, 134b and 134c, each associated compensation trigger is triggered causing an initiate signal to be supplied to compensation signal generator 166.

Each single phase delay controller, such as 134a, having received an auxiliary thyristor gating signal, also produces a ramp signal at ramp signal output terminal 137 which is received at the first comparator input 159a of a corresponding compensation trigger such as 156a. Each of analog switches 182a through 182c, respectively, responsive to the delay signal at delay output terminal 152 of an associated one of delay controllers 134a through 134c, respectively, is now "closed" permitting intermediate reference signals generated by the respective pairs of delay controllers 134b and 134c, 134c and 134a and 134a and 134b, to be summed at summing amplifiers 180a, 180b and 180c, respectively, and then supplied to the second comparator input 159b of a respective one of compensation triggers 156a through 156c.

If the amplitude of the ramp signal generated by each of single phase delay controllers 134a–134c exceeds the reference inverter firing delay signal produced by algebraic combination of single phase delay controller input signals with the compensation ramp signal, then the delay signal supplied by each single phase delay controller is interrupted, resulting in a main thyristor within a corresponding phase inverter being gated into conduction, thus ending the cummutation interval of each phase inverter.

During the interval when the magnitude of the reference inverter firing delay signal of each single phase delay controller exceeds the magnitude of the single phase delay controller ramp signal, the reference inverter firing delay signal of each single phase delay controller is continuously decremented proportional to $L_m/L_d$ until such time as the combination of intermediate reference signals received from the pair of remaining single phase delay controllers equals the ramp signal amplitude, at which time the compensation ramp signal amplitude becomes fixed at a constant level. With the compensation ramp signal amplitude this fixed, the ramp signal produced by each single phase delay controller continues to increase in amplitude until it equals the now-fixed reference inverter firing delay signal amplitude, at which time the delay signal from each single phase delay controller is interrupted, resulting in the main thyristor within each phase inverter being gated into conduction. Simultaneously, the discharge signal at discharge output 154 goes "high", causing the ramp generator within each single phase delay controller to be reset together with compensation generator 166.

Although the operation of polyphase delay controller 175 has been described for the condition of simultaneous interference of three mutually interfering individual phase inverters, it is equally effective for controlling a corresponding pair of interfering phase inverters.

The foregoing describes a method and apparatus for reducing inverter losses and limiting commutation time intervals of an impulse-commutated inverter by suitable automatic adjustment of inverter thyristor firing delay intervals. Additionally, automatic adjustment of inverter thyristor firing delay intervals of each individual interfering phase inverter within a polyphase inverter substantially reduces mutual phase inverter interference.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. For use with an auxiliary impulse commutated inverter having a pair of operatively coupled main thyristors, each said main thyristor being gated during alternate intervals to conduct current from voltage source to a load, and having a pair of operatively coupled auxiliary thyristors, each said auxiliary thyristor being gated into conduction to commutate a then-conductive one of said main thyristors, an improved method for controlling said inverter by adjusting the time delay interval between current conduction through one of said auxiliary thyristors and subsequent current conduction through the remaining nonconductive main thyristor, comprising the steps of:

(a) generating a timing duration signal of continuously increasing amplitude in response to current conduction through one of said auxiliary thyristors;

(b) generating a reference inverter firing delay signal, representative of a predetermined delay interval between conduction of one of said auxiliary thyristors and subsequent conduction of a remaining, nonconductive main thyristor, in accordance with inverter load current;

(c) providing a delay signal to said inverter during intervals when the magnitude of said reference inverter firing delay signal exceeds the magnitude of said timing duration signal to cause said inverter to delay conduction of said remaining nonconductive main thyristor; and (d) terminating said delay signal when the magnitude of said timing duration signal exceeds the magnitude of said reference inverter firing delay signal thereby causing said inverter to render said remaining nonconductive main thyristor conductive.

2. The invention according to claim 1 wherein said timing duration signal increases in amplitude at a constant rate.

3. The method according to claim 2 wherein said reference inverter firing delay signal is proportional to the ratio of inverter load current magnitude to the voltage magnitude of said voltage source.

4. The method according to claim 1 wherein the step of generating said reference inverter firing delay signal comprises the steps of:

(a) generating an intermediate signal proportional to the ratio of the absolute magnitude of inverter load current to the voltage magnitude of said voltage source; and (b) algebraically summing said intermediate signal with a fixed value reference signal, representing a predetermined time interval between gating one of said auxiliary thyristors into conduction at the commencement of commutation and subsequently gating a main thyristor into conduction under conditions when inverter load current is zero, to yield a reference inverter firing delay signal proportional to the difference in magnitude between said intermediate signal and said fixed value reference signal.

5. The method according to claim 1 wherein the step of generating said reference inverter firing delay signal comprises the steps of:

(a) generating a first intermediate signal proportional to the magnitude ratio of the absolute value of inverter load current to the voltage of said voltage source;

(b) algebraically combining said first intermediate signal with a first reference signal of predetermined amplitude proportional to the magnitude of the current transferred by conduction of a remaining, previously nonconductive main thyristor, to yield a second intermediate signal proportional to the difference in magnitude between said first intermediate signal and said first reference signal; and (c) algebraically summing said second intermediate signal when a second reference signal representative of a preselected time interval between initial current conduction through one of said inverter auxiliary thyristors and subsequent current transfer through a previously nonconductive main thyristor, to yield a reference inverter firing delay signal proportional to the difference in magnitude between said second reference signal and said second intermediate signal.

6. For use with an auxiliary impulse commutated inverter having a load coupled thereto and having a pair of main thyristors, each said main thyristor alternately conducting current from a voltage source to said load, and a pair of auxiliary thyristors, each said auxiliary thyristor being rendered conductive to commutate a then-conductive main thyristor, apparatus for improving performance of said inverter by adjusting the time delay interval between conduction of an auxiliary thyristor for commutation of a then-conductive main thyristor and subsequent conduction of the remaining nonconductive main thyristor, comprising:

(a) timing duration signal generating means for generating a timing signal of continuously increasing amplitude in response to conduction of one of said auxiliary thyristors;

(b) reference inverter firing delay signal generator means for generating a signal representative of a predetermined time duration between conduction of an auxiliary thyristor and subsequent conduction of a remaining nonconductive main thyristor in accordance with the magnitude of inverter load current; and (c) trigger means for controlling conduction of a remaining nonconductive main thyristor and for resetting said timing duration signal generating means in accordance with the difference in magnitude between said timing signal and said reference inverter firing delay signal.

7. The invention according to claim 6 wherein said timing duration signal generating means comprises a ramp generator.

8. The invention according to claim 6 wherein said reference inverter firing delay signal generating means comprises:

(a) first conduit means adapted for coupling to said inverter for providing an output signal proportional in amplitude to the ratio of the inverter load current magnitude to the voltage magnitude of said voltage source; and (b) second circuit means coupled to said first circuit means for algebraically combining said first circuit means output signal with at least one reference signal of predetermined amplitude such that said reference inverter firing delay signal amplitude is proportional to the amplitude difference between said reference signal and said first circuit means output signal.

9. The invention according to claim 8 wherein said first circuit means comprises:

(a) polarity processor means for providing, from a signal derived from said inverter proportional to inverter load current, a signal proportional to the inverter load current magnitude; and (b) analog divider means for providing, in accordance with the magnitude of said polarity processor output signal and the voltage magnitude of said voltage source, an output signal proportional to the ratio of said polarity processor signal magnitude to said voltage source voltage magnitude.

10. The invention according to claim 8 wherein said second circuit means includes: a summing amplifier for providing a reference inverter firing delay signal according to the amplitude difference between said first circuit means output signal and a reference signal of predetermined amplitude representing time duration between gating a respective one of said auxiliary thyristors into conduction at commencement of commutation and subsequently gating a respective one of said main thyristors into conduction when current through said inverter load is zero.

11. The invention according to claim 8 wherein said second circuit means includes:

(a) a first summing amplifier for providing a signal proportional to the difference in magnitude between said first circuit means output signal and a first reference signal of predetermined amplitude proportional to the magnitude of current transferred through said remaining nonconductive main thyristor when said remaining nonconductive main thyristor is gated into conduction; and (b) a second summing amplifier for providing a reference inverter firing delay signal proportional to the difference in magnitude between said signal provided by said first summing amplifier and a second reference signal of predetermined amplitude proportional to the duration of the interval between conduction of an auxiliary thyristor for commutation of said then-conductive main inverter thyristor and subsequent current transfer through said remaining nonconductive main thyristor.

12. For use with an auxiliary impulse commutated inverter having a load coupled thereto and having a pair of operatively coupled main thyristors and a pair of operatively coupled auxiliary thyristors, each said main thyristor alternately conducting current from a voltage source to said load, said auxiliary thyristors each being rendered conductive to commutate a corresponding then-conductive main thyristor, apparatus for improving performance of said inverter by controlling the delay interval between conduction of an auxiliary thyristor for commutation of a then-conductive main thyristor and subsequent current transfer through the remaining nonconducive main thyristor comprising:

(a) first circuit means for producing an output signal of continuously increasing amplitude in response to a received initiate signal, the rate of amplitude increase of said signal of continuously increasing amplitude varying in accordance with the magnitude of said initiate signal;

(b) second circuit means for varying the magnitude of said initiate signal supplied to said first circuit means by a fixed proportion in accordance with the instantaneous difference between the magnitude of inverter load current and the absolute magnitude of auxiliary thyristor current; and (c) third circuit means coupled to said first and second circuit means for providing a delay signal for controlling conduction of the remaining nonconductive main thyristor in accordance with the difference in magnitude between said first circuit means output signal and a reference signal of predetermined amplitude representing the fixed time interval between gating one of said auxiliary thyristors into conduction at commencement of commutation and subsequently gating said nonconductive main thyristor into conduction under conditions where current through said inverter load is zero.

13. The invention according to claim 12 wherein said second circuit means comprises:
   (a) current sensor means for generating a signal proportional in duration to the interval between initial gating of one of said auxiliary thyristors into conduction and transfer by said auxiliary thyristor of current proportional in magnitude to the magnitude of inverter load current;
   (b) trigger means for providing an initiate signal to said first circuit means in response to a prescribed relationship between said auxiliary thyristor gating signal and said current sensor means signal; and
   (c) means for coupling the output of said trigger means to said first circuit means.

14. The invention according to claim 13 wherein said current sensor means comprises:
   (a) a first current monitor for providing, in response to a signal proportional to the magnitude of auxiliary thyristor current, a signal proportional to the absolute magnitude of auxiliary thyristor current;
   (b) a second current monitor for providing, in response to a signal proportional to the magnitude of inverter load current, a signal proportional to the absolute magnitude of inverter load current; and
   (c) comparator means coupled to said first and second current monitors for providing an output signal in accordance with the difference between magnitude of signals received from said first and second current monitors, respectively.

15. The invention according to claim 13 wherein said trigger means comprises:
   (a) a JK flip-flop having the J input coupled to receive auxiliary thyristor gating pulses and the K input coupled to receive the output signal from said current sensor means, said flip-flop providing output signals at the Q and $\bar{Q}$ outputs in accordance with a first and second prescribed relationship respectively, of input signals received at the J and K inputs; and
   (b) an amplifier coupled to the flip-flop Q output for suppying to said first circuit means with a signal proportional to said Q flip-flop output signal.

16. The invention according to claim 13 wherein said means for coupling the output of said trigger means to said first circuit means comprises:
   (a) polarity processor means coupled to receive auxiliary thyristor gating pulses and a signal proportional to inverter load current, said polarity processor means providing an output signal varying in accordance with the inverter commutation sequence type;
   (b) summing amplifier means having at least one invert and one noninvert input; and
   (c) analog switching means coupling the output of said trigger means to one or the other of said invert and noninvert inputs of said summing amplifier means in accordance with the polarity of said polarity processor means output signal.

17. The invention according to claim 12 wherein said third circuit means comprises:
   (a) a comparator for providing a logic output signal in accordance with the difference in magnitude between said first circuit means signal and a reference signal of predetermined amplitude representing the time interval between conduction of an auxiliary thyristor at the commencement of commutation of a then-conductive main inverter thyristor and subsequent current conduction through the remaining nonconductive main thyristor under conditions where current through said inverter load is zero; and
   (b) a JK flip-flop adapted to receive auxiliary thyristor gating pulse signals at the J input and said comparator output signal at the K input, said flip-flop supplying a delay signal to said inverter and said flip-flop supplying a discharge signal to said first circuit means when said J and K input signals are of a prescribed relationship.

18. For use with a polyphase inverter comprised of N individual phase inverters, ach said phase inverter having a pair of operatively coupled main and auxiliary thyristors, said main thyristors of each said phase inverter alternately conducting current from a voltage source to a corresponding phase of an N-phase load, each of said auxiliary thyristors being rendered conductive to commutate a then-conductive one of said main inverter thyristors, apparatus for controlling said polyphase inverter to reduce interference between mutually commutating phase inverters by adjusting the delay interval between conduction of one of said auxiliary thyristors and conduction of a previously nonconductive main thyristor within each of said N-phase inverters, comprising:
   (a) means for generating a compensation signal;
   (b) a plurality of N adjustable delay controllers for controlling each of said N phase inverters, each delay controller supplying to each said inverter, in response to conduction of an inverter auxiliary thyristor, a delay signal to delay conduction of a then-nonconductive main thyristor, said delay signal being proportional in duration to a fixed relationship among phase inverter load current, said compensation signal and at least one fixed-valued reference signal; and
   (c) a plurality of N compensation triggers, each said compensation trigger having a first input coupled to a respective one of said adjustable delay controllers and a second input adapted for coupling to each of said other adjustable delay controllers controlling a then-interfering one of said phase inverters, said compensation triggers each determining the presence of interference between one of said phase inverters and N-1 remaining phase inverters and coupled to said means for generating a compensation signal so as to control said means for generating a compensation signal in response to interference between said phase inverters.

19. The invention according to claim 18 wherein each of said delay controllers includes:
   (a) a plurality of N summing amplifiers, each of said summing amplifiers having at least $N-1$ inputs and an output coupled to the second input of a respective one of said compensation triggers for summing signals received at each of said $N-1$ inputs from each of $N-1$ adjustable delay controllers; and
   (b) an analog switch coupling each adjustable delay controller to an input of each of $N-1$ summing amplifiers in response to conduction of said previously nonconductive main thyristor within a respective one of said N phase inverters.

20. The invention according to claim 19 further including logic means for coupling each of said compensation triggers to said means for generating a compensation signal, said logic means comprising:

(a) a plurality of Z NAND type logic gates each having a pair of inputs, each input being adapted for coupling to the output of a separate one of a pair of compensation triggers, respectively, Z being given by the relationship $$Z = \sum_{i=1}^{N} (i - 1),$$

the output of each said logic gate being coupled to said means for generating a compensation signal.

21. The invention according to claim 19 wherein said means for generating a compensation signal comprises:

(a) ramp generator means for generating a ramp signal in response to a received initiate signal and for terminating said ramp signal in response to a received terminate signal; and (b) an amplifier having preselected gain and coupling the output of said ramp generator means to each of said N delay controllers.

22. The invention according to claim 19 wherein each of said N adjustable delay controllers comprises:

(a) means for generating a ramp signal in response to conduction of one of said auxiliary thyristors of a respective one of said N phase inverters;

(b) means for generating a reference inverter firing delay signal representative of a predetermined time duration between initiation of conduction of said one of said auxiliary thyristors and subsequent initiation of conduction of one of said main thyristors in accordance with a predetermined relationship among at least one reference signal of a fixed value, said compensation signal, and a signal proportional to inverter load current; and (c) trigger means for controlling conduction of a remaining nonconductive main thyristor and for controlling said means for generating a ramp signal in accordance with the difference in magnitude between said ramp signal and said reference inverter firing delay signal.

23. The invention according to claim 19 wherein each of said N compensation triggers comprises:

(a) a comparator having a first input adapted for coupling to a corresponding one of said N adjustable delay controllers, respectively, and a second input adapted for coupling to each of $N-1$ adjustable delay controllers controlling a then-interfering phase inverter; and (b) a JK flip-flop having a first input coupled to said comparator output and a second input coupled to a corresponding one of said N adjustable delay controllers, respectively, for receiving said delay signal, said flip-flop providing a signal for controlling said means for generating a compensation signal in response to a prescribed relationship between input signals received at the first and second inputs, respectively, of said flip-flop.

* * * * *